US008462103B1

(12) United States Patent
Moscovitch et al.

(10) Patent No.: US 8,462,103 B1
(45) Date of Patent: Jun. 11, 2013

(54) COMPUTER DISPLAY SCREEN SYSTEM AND ADJUSTABLE SCREEN MOUNT, AND SWINGING SCREENS THEREFOR

(76) Inventors: Jerry Moscovitch, Toronto (CA); Ian C. Hall, Mississauga (CA); Son Chung, Toronto (CA); Mark D. Elchuk, Troy, MI (US)

( * ) Notice: Subject to any disclaimer, the term of this patent is extended or adjusted under 35 U.S.C. 154(b) by 0 days.

(21) Appl. No.: 09/869,259

(22) PCT Filed: Dec. 21, 1999

(86) PCT No.: PCT/US99/30733
§ 371 (c)(1),
(2), (4) Date: Nov. 28, 2001

(87) PCT Pub. No.: WO00/39493
PCT Pub. Date: Jul. 6, 2000

(51) Int. Cl.
*G09G 5/00* (2006.01)
(52) U.S. Cl.
USPC ............... 345/156; 345/1.1; 345/1.3; 345/55
(58) Field of Classification Search
USPC ................. 345/156, 419, 173, 168, 169, 1.1,
345/1.3, 55; 248/122.1, 371, 343; 361/681,
361/682, 680; 439/13, 162
See application file for complete search history.

(56) References Cited

U.S. PATENT DOCUMENTS

| | | |
|---|---|---|
| 723,114 A | 3/1903 | Witt |
| 2,794,554 A | 6/1957 | Donner |
| 2,890,010 A | 6/1959 | Barkheimer ................ 248/157 |
| 2,937,381 A | 5/1960 | Manas |
| 3,262,517 A | 7/1966 | Mateo |
| 3,734,301 A | 5/1973 | Rastocny |
| D244,571 S | 6/1977 | Cowan, Jr. |
| 4,112,423 A | 9/1978 | Bertolasi ....................... 345/156 |
| 4,159,417 A | 6/1979 | Rubincam ..................... 235/375 |

(Continued)

FOREIGN PATENT DOCUMENTS

| | | |
|---|---|---|
| DE | 4027556 A | 3/1992 |
| DE | 9406985 | 10/1995 |

(Continued)

OTHER PUBLICATIONS

Brochure on "Galileo 15" from Specialized Technology Group, dated Sep. 8, 1998.

(Continued)

*Primary Examiner* — William Boddie
*Assistant Examiner* — Leonid Shapiro

(57) ABSTRACT

A dual screen display system (10) having, a base (24), a pair of electronic display screens (16), an arm assembly (20, 22) supporting the display screens (16) and connected to the base, swingable mountings (28, 30) for swingably mounting the display screens, the mountings being adjustable as to the angular orientation of each of the display screens relative to the arm assembly between a first arrangement with the screens in a common plane, and a second arrangement in which the screens are inwardly swung positions thereby to permit each of the screens to be swung into desired operative angular orientation, and adjustable movement limiting devices (54), engaging the swinging mountings and limiting movement of the screens. Also disclosed are interchangeable mounting brackets (80, 86) for mounting screens of varying sizes, or for mounting screens in various configurations, and hingeable screens (12A, 12B) swingable to display to opposite sides, and a swingable ball and socket mounting for mounting various articles in a desired orientation. Various alternative embodiments of support arm assemblies are disclosed.

18 Claims, 55 Drawing Sheets

U.S. PATENT DOCUMENTS

| | | | | |
|---|---|---|---|---|
| 4,267,555 | A | 5/1981 | Boyd et al. | |
| 4,438,458 | A | 3/1984 | Munscher | 348/838 |
| 4,453,687 | A | 6/1984 | Sweere | |
| D278,820 | S | 5/1985 | Woodhall | D14/306 |
| 4,547,027 | A | 10/1985 | Scheibenreif | 439/13 |
| 4,589,713 | A | 5/1986 | Pfuhl | 439/162 |
| 4,619,429 | A | 10/1986 | Mazza | |
| 4,646,875 | A | 3/1987 | Sholl | |
| 4,662,797 | A | 5/1987 | Helgeland | |
| 4,726,552 | A | 2/1988 | Warshawsky | |
| D295,415 | S | 4/1988 | Thies et al. | |
| 4,770,303 | A | 9/1988 | Boyd | |
| 4,814,759 | A * | 3/1989 | Gombrich et al. | 345/60 |
| D300,699 | S | 4/1989 | Penrod | |
| 4,831,368 | A | 5/1989 | Masimo et al. | |
| 4,836,478 | A | 6/1989 | Sweere | |
| 4,979,579 | A | 12/1990 | Dardat | 177/180 |
| 5,009,384 | A | 4/1991 | Gerke | 248/343 |
| 5,012,345 | A * | 4/1991 | Elworthy | 348/97 |
| 5,035,392 | A | 7/1991 | Gross et al. | |
| 5,067,834 | A | 11/1991 | Szmanda et al. | |
| 5,076,524 | A | 12/1991 | Reh et al. | |
| 5,122,941 | A | 6/1992 | Gross | 362/276 |
| 5,128,662 | A | 7/1992 | Failla | 345/1.3 |
| 5,132,492 | A | 7/1992 | Wieder | |
| 5,134,390 | A | 7/1992 | Kishimoto et al. | |
| 5,177,616 | A | 1/1993 | Riday | |
| 5,179,447 | A | 1/1993 | Lain | |
| 5,195,709 | A | 3/1993 | Yasushi | |
| 5,210,656 | A | 5/1993 | Williamson | |
| 5,222,780 | A | 6/1993 | Reh et al. | |
| 5,224,060 | A | 6/1993 | Ma | |
| 5,224,861 | A | 7/1993 | Glass | 434/35 |
| D340,235 | S | 10/1993 | Robak | D14/373 |
| 5,278,779 | A * | 1/1994 | Conway et al. | 361/680 |
| 5,316,369 | A | 5/1994 | Kanda | |
| 5,329,289 | A | 7/1994 | Sakamoto et al. | |
| 5,337,676 | A | 8/1994 | Ahad | |
| 5,383,138 | A | 1/1995 | Motoyama | |
| 5,383,642 | A | 1/1995 | Strassberg | |
| 5,467,102 | A | 11/1995 | Kuno | 345/1.3 |
| 5,494,447 | A | 2/1996 | Zaidan | 439/31 |
| 5,505,424 | A | 4/1996 | Niemann | |
| D371,449 | S | 7/1996 | Huang | |
| 5,534,888 | A | 7/1996 | Lebby | 345/672 |
| 5,537,127 | A | 7/1996 | Jingu | |
| 5,537,290 | A | 7/1996 | Brown et al. | |
| 5,547,248 | A | 8/1996 | Marechal | |
| 5,589,849 | A | 12/1996 | Ditzik | |
| 5,590,021 | A | 12/1996 | Register | |
| 5,600,580 | A | 2/1997 | Honjo | 361/681 |
| 5,673,170 | A * | 9/1997 | Register | 361/681 |
| 5,675,687 | A | 10/1997 | Wood | 385/115 |
| 5,687,939 | A * | 11/1997 | Moscovitch | 248/122.1 |
| 5,729,429 | A | 3/1998 | Margaritis | 361/680 |
| 5,729,430 | A | 3/1998 | Johnson | 361/682 |
| 5,732,922 | A | 3/1998 | Jeon | 248/371 |
| D395,041 | S | 6/1998 | Leveridge et al. | |
| D395,298 | S | 6/1998 | Rosen | |
| 5,768,163 | A * | 6/1998 | Smith, II | 708/105 |
| 5,777,704 | A | 7/1998 | Selker | |
| 5,796,577 | A | 8/1998 | Ouchi et al. | |
| 5,812,368 | A | 9/1998 | Chen | |
| 5,815,735 | A | 9/1998 | Baker | |
| 5,820,623 | A | 10/1998 | Ng | 606/1 |
| 5,847,698 | A * | 12/1998 | Reavey et al. | 345/173 |
| 5,854,735 | A | 12/1998 | Cheng | |
| 5,867,210 | A | 2/1999 | Rod | |
| 5,873,554 | A | 2/1999 | Nobuchi | |
| 5,900,848 | A * | 5/1999 | Haneda et al. | 345/1.1 |
| 5,904,328 | A * | 5/1999 | Leveridge et al. | 248/124.1 |
| 5,918,841 | A | 7/1999 | Sweere | 248/123.11 |
| 5,949,643 | A | 9/1999 | Batio | |
| 6,015,120 | A | 1/2000 | Sweere | 248/123.11 |
| 6,019,332 | A | 2/2000 | Sweere | 248/284.1 |
| 6,020,890 | A | 2/2000 | Kohda | 345/890 |
| D425,036 | S | 5/2000 | Copus et al. | |
| 6,061,104 | A | 5/2000 | Evanicky | 248/274.1 |
| 6,064,373 | A | 5/2000 | Ditzik | 345/173 |
| 6,094,341 | A | 7/2000 | Lin | |
| 6,134,103 | A | 10/2000 | Ghanma | 361/681 |
| 6,151,401 | A | 11/2000 | Annaratone | |
| 6,222,507 | B1 | 4/2001 | Gouko | |
| D448,023 | S | 9/2001 | Kim | |
| 6,295,038 | B1 * | 9/2001 | Rebeske | 345/1.1 |
| 6,302,612 | B1 * | 10/2001 | Fowler et al. | 403/76 |
| 6,343,006 | B1 * | 1/2002 | Moscovitch et al. | 361/679.04 |
| 6,449,143 | B2 | 9/2002 | Rooyakkers et al. | |
| 6,532,146 | B1 | 3/2003 | Duquette | |
| 6,554,238 | B1 | 4/2003 | Hibberd | |
| 6,587,082 | B1 | 7/2003 | Moore | |
| 6,667,877 | B2 | 12/2003 | Duquette | |
| 6,667,878 | B2 | 12/2003 | Ponx | |
| 6,681,529 | B1 * | 1/2004 | Baloga et al. | 52/29 |
| 6,739,096 | B2 | 5/2004 | Feldpausch et al. | |
| 7,091,961 | B2 * | 8/2006 | Ditzik | 345/173 |
| 7,703,733 | B2 | 4/2010 | Price et al. | |
| 2005/0146845 | A1 | 7/2005 | Moscovitch | |
| 2008/0117578 | A1 | 5/2008 | Moscovitch | |
| 2008/0316689 | A1 | 12/2008 | Moscovitch | |

FOREIGN PATENT DOCUMENTS

| | | |
|---|---|---|
| DE | 19541759 A1 | 5/1997 |
| DE | 29901751 U | 4/1999 |
| DE | 19800376 | 7/1999 |
| DE | 19802503 A1 | 7/1999 |
| EP | 0424074 A | 4/1991 |
| EP | 97302491.2 | 4/1997 |
| FR | 2554269 A | 5/1985 |
| GB | 8800808 | 1/1988 |
| GB | 9312660.5 | 6/1993 |
| GB | 9600860.2 | 1/1996 |
| GB | 2333391 A | 7/1999 |
| JP | 62-146225 U | 9/1987 |
| JP | 62-197815 | 9/1987 |
| JP | 63-233417 | 9/1988 |
| JP | 3291722 A | 12/1991 |
| JP | 04-015680 | 1/1992 |
| JP | 6161600 | 11/1992 |
| JP | 7160364 | 12/1993 |
| JP | 06-004778 | 1/1994 |
| JP | 6161703 | 6/1994 |
| JP | 6324753 | 11/1994 |
| JP | 6324759 A | 11/1994 |
| JP | 10055165 | 2/1998 |
| JP | 10171382 A | 6/1998 |
| JP | 10-222091 | 8/1998 |
| JP | 11-271745 | 10/1999 |
| JP | 11271730 A | 10/1999 |
| WO | 98-45772 | 11/1998 |
| WO | WO9918491 A1 | 4/1999 |
| WO | WO9939328 A1 | 8/1999 |
| WO | WO9950813 | 10/1999 |

OTHER PUBLICATIONS

Advertisement from Smart Glas, dated Sep. 8, 1998.
International Search Report for Application No. PCT/US99/30733 (Applicant/Inventor: Jerry Moscovitch).
U.S. Appl. No. 10/130,416, filed May 17, 2002, Moscovitch.
U.S. Appl. No. 10/766,751, filed Jan. 29, 2004, Moscovitch.
Complaint for Patent Infringement of Patent No. Re36,978; Filed Jul. 7, 2006; Plaintiffs: Mass EDI and Jerry Moscovitch.
European Search Report for Appln. No. 00974714.8; Date: Sep. 5, 2005; Applicant Jerry Moscovitch.
European Search Report for Appln. No. 00974714.8; Date: May 7, 2007; Applicant Jerry Moscovitch.
Office Action for U.S. Appl. No. 11/340,723, filed Jan. 27, 2006; Inventor: Jerry Moscovitch; Date of Office Action: Mar. 5, 2007.
Ergotron Ergonomic Computer Workstations Component Product Catalog (labeled DEL 004607-DEL 004648; Jul. 1, 1992).
PC Workstation Publication (labeled DEL 004692 and also E-031429); Modern Office Technology; Nov. 1988.
National TeleVAR Publication (labeled DEL 004693); TypeWorld; First Aug. 1990; Issue 11.

Raster Devices 2 Direct Inc. (labeled DEL 004690); Mar. 1990.
Ergotron Postcard Publication (labeled DEL 004691); 1992.
Raster Devices 2 Direct Inc. (labeled DEL 004689); Apr. 1990.
Ergotron Postcard Publication (labeled DEL 004570); 1992.
Mac II Workstation Publication (labeled DEL 004571-DEL 004572); MacWEEK; Oct. 11, 1998.
Mac II Workstation Publication (labeled DEL 004573); MacWEEK; Oct. 11, 1998.
Ergotron Design Station Publication (labeled DEL 004574).
Raster Devices 2 Direct Inc. Publication (labeled DEL 004575); Apr. 1990.
Raster Devices 2 Direct Inc. Publication (labeled DEL 004576); Mar. 1990.
Graphics and Design Publication (labeled DEL 004579; "early 90's".
Ergotron LAN Racking and Cable Management Systems Product Catalog (labeled DEL 004580); Mar. 1, 1995.
Computer Racking System Publication (labeled E-031476); Managing Office Technology; Aug. 1993.
European Search Report for Appln. No. 00974714.8; Date: May 4, 2005; Applicant Jerry Moscovitch.
Japanese Office Action (translation) mailed Oct. 13, 2009; Application No. 2001-539097; Jerry Moscovitch (inventor); claims appended.
Japanese Office Action (translation) mailed Oct. 13, 2009; Application No. 2000-591355; Jerry Moscovitch (inventor).
Cover Letter from Matthew J.S. Graham, Attorney for Ergotron, Inc.; dated Aug. 14, 2009.
DS100 Flyer dated Jul. 23, 2002.
DS100 Install Manual dated Mar. 2003.
FP Order Guide dated Dec. 12, 2002.
FPM Arm Catalog dated Aug. 2002.
XBar Extens Install Manual dated Mar. 2003.
Invoice No. 196156 to Bloomberg.
Invoice No. 158382 to Trikinetic Technologies.
Invoice No. 158045 to Baymont Inn.
Package from Damon A. Neagle of Design IP (representing Innovative Office Products, Inc.) dated Jan. 8, 2010; package includes cover letter, and six appended documents (Tabs 1-6).
Complaint filed Nov. 12, 2009 in the U.S. District Court for the Eastern District of Texas; Cause No. 2:09-cv-358; Mass Engineered Design Inc. and Jerry Moscovitch, defendants.
U.S. Appl. No. 12/696,929; inventor: Jerry Moscovitch, filed Jan. 29, 2010
Doublesight catalog found at http://www.doublesight.com/files/ds-219sta-catalog.pdf Catalog downloaded from website on May 18, 2010.
9XMedia webpage: http://www.9xmedia.com/new/products/xtop.php Above webpage copyrighted 2009.
Chief Manufacturing Brochure found at http://downloads.chiefmfg.com/MARKETING/Flyers-Brochures/BRO_MonitorSolutions.pdf Downloaded from website on May 18, 2010.
Ergotron product sheet (LX Dual Stacking Arm) found at http://ergotron.com/Products/tabid/65/PRDID/355/language/en-CA/default.aspx rev. Mar. 1, 2010.
Atdec installation manual found at http://www.atdec.com.au/Content_Common/pr-Multi-Screen-Mounting-Solutions_Focus-double-8kg.seo Manual printed Feb. 2, 2008.
Ergotron product sheet (LX Dual Side-by-Side Arm) found at http://ergotron.com/Products/tabid/65/PRDID/354/language/en-CA/default.aspx rev. Mar. 2, 2010.
Jetmaster-Tetra webpage http://www.ergoindemand.com/monitor_arms_jetmaster.htm webpage downloaded May 19, 2010.
Consol catalog found at http://www.custom-products.com/CustomProducts/Info.nsf/GetResource/PDF_LCD-CATALOGS-NEW/$file/CPS-pole-orderguide-4-09.pdf rev. Apr. 2009.
Ergotech webpage http://www.ergotechgroup.com/products/articulating-mount-41/dual-horizontal-articulating-arm-monitor-mount-74/# webpage has 2010 copyright.
Ziotek webpage http://www.ziotek.com/Templates/SearchDetail.asp?productID=25978 webpage has 2010 copyright.
Humanscale webpage http://humanscale.com/products/M7M4Common.pdf webpage downloaded May 20, 2010.
Innovative Office Products brochure http://www.lcdarms.com/uploads/brochures/9198_literature.pdf brochure downloaded May 20, 2010.
Ergomount webpage http://www.ergomounts.co.uk/largeimage.aspx?iid=390 year:2008.
Grandstand webpage: http://grandstands.com/GS%202008%20Price%20List%20PDFs/GS%202008%20Flatscreen%20supports.pdf webpage downloaded on May 20, 2010.
ESI Ergonomic webpage: http://esiergo.com/products/monitorsolutions/MMFS2.asp webpage downloaded May 20, 2010.
Ergonomic Accessories webpage: http://www.ergonomicaccessories.com/documents/LCDMonitorArms-Lifts-Supports-05.pdf webpage downloaded on May 20, 2010.
Pages 12 and 13 of Right Angle Products brochure found at: http://www.rightangleproducts.com/RightAngle.pdf brochure downloaded on May 20, 2010.
Targus webpage: http://www.targus.com/US/Downloads/AWE33_UG.pdf Copyright 2008.
Ergomart webpage: http://www.ergomart.com/lcd_monitor_stands/lcd_monitor_stand.htm Copyright 2001-2010.
Vartech webpage: http://www.vartechsystems.com/products/resources/mounting_arms.asp Copyright 2010.
Misco Webpage http://www.misco.co.uk/applications/SearchTools/item-details.asp?EdpNo=145333&CatId=1117 Copyright 2010.
Workrite webpage http://www.workriteergo.com/products/productmain.asp?famID=90 Copyright 2008.
Herman Miller webpage http://www.hermanmiller.com/MarketFacingTech/hmc/products/Flat_Panel_Monitor_Support/bro_thebecollection_monitorarms.pdf Copyright 2009.
Spaceco webpage http://spaceco.com/sa_benifits_features.php webpage downloaded May 21, 2010.
Cyber Research webpage http://www.cyberresearch.com/store/lcd-monitors-displays-keyboards-kvm-switches/swivel-arms-mounting-brackets-monitor-stands/SWS_452-207_4930.2.htm Copyright 2010.
Tyke Supply webpage http://www.tykesupply.com/Products.html downloaded webpage on May 21, 2010.
USPTO webpage showing trademark information for Steelcase Inc.'s FYI product http://tess2.uspto.gov/bin/showfield?f=doc&state=4003:sbtv2e.4.1 Trademark filing date: Jul. 26, 2006.
Details (a Steelcase company) webpage for FYI monitor stand http://details-worktools.com/media/product_lit/FYI_Dual_Flat_Panel_Arm_Assembly_0207.pdf dated Feb. 2006.
Knoll brochure http://www.knoll.com/products/pricelists/KnollExtra_Wishbone_update42106.pdf downloaded May 25, 2010; 1999 and 2000 design awards (mentioned on p. 109).
FX The Business of Design Article on Colebrook Bosson and Saunders (designers of Knoll Wishbone product); article written by Jamie Mitchell; article states Wishbone flat screen arm was developed in 1999 Article found at: http://www.fxmagazine.co.uk/story.asp?storyCode=2397 Article dated Mar. 11, 2009.
USPTO webpage showing trademark information for Colebrook Bosson and Saunders Wishbone product http://tess2.uspto.gov/bin/showfield?f=doc&state=4009:73juu3.2.1 Trademark filing date: Jul. 18, 2003.
Ergo in Demand webpage http://www.ergoindemand.com/monitor-arms-multiple-monitors.htm Copyright 2000-2010.
EZOffice Inc. Aluminum Die-Casting Quad LCD Arm Features http://ezofficeinc.com/?page_id=271 copyright 2011.
Anthro Corporation ("More Arms" section) http://www.anthro.com/furniture.aspx?computer-cart=security-stools-more-arms copyright 2011.
Cotytech http://www.cotytech.com/content-categories/cat-191_194_214/dual_monitor_mounts.html representative DM-21A2 specification copyright 2005-2011.
Mayline Group http://www.mayline.com/showcase/transaction/tech_accessories.html copyright 2010.
Modern Solid http://www.mosolid.com.tw/product.php?mode=list&cid=81 representative LA-6A7-1 and LA-935 products copyright 2010.

Highgrade Tech Co. Ltd; http://www.highgrade.com.tw/ (print out obtained from "LCD Monitor Stand" Section) representative TS743 product downloaded Aug. 2011.

Multiplex PC http://www.multiplexpc.com/Apex-Dual-Tiered-5-over-5-LCD-Monitor-Mount-p/900-f20-b55.htm copyright 2011.

Teknion Corporation http://www.teknion.com/products/brochures/Complements09_ENG.pdf portion of brochure including p. 30; Feb. 28, 2011.

* cited by examiner

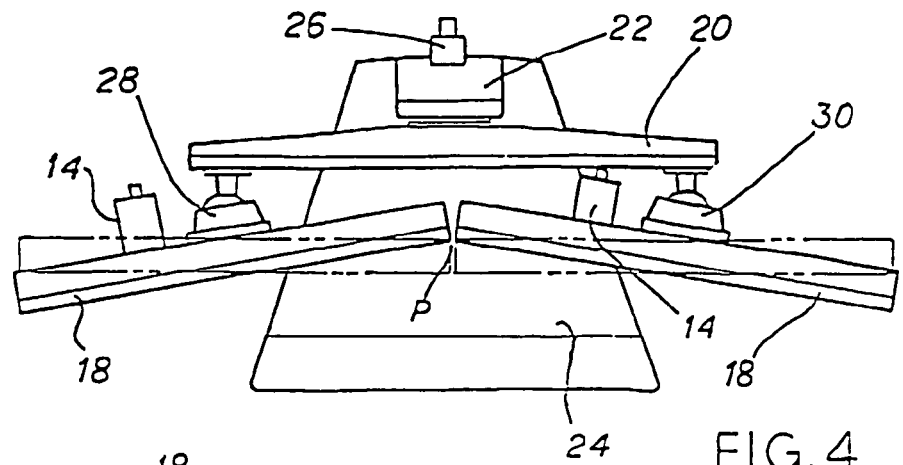
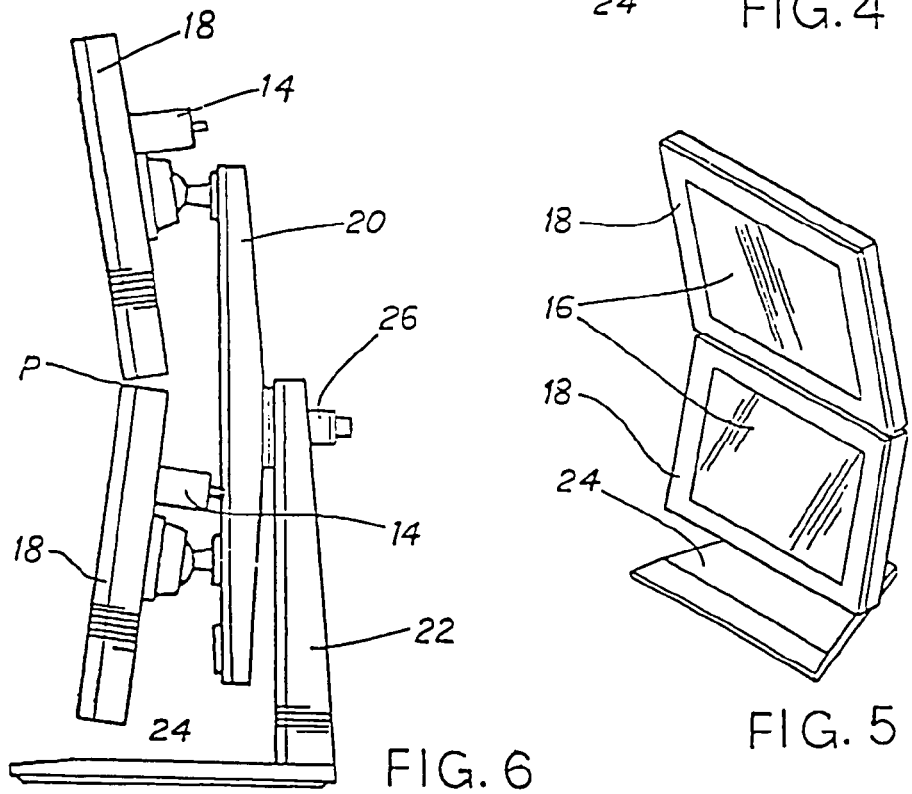

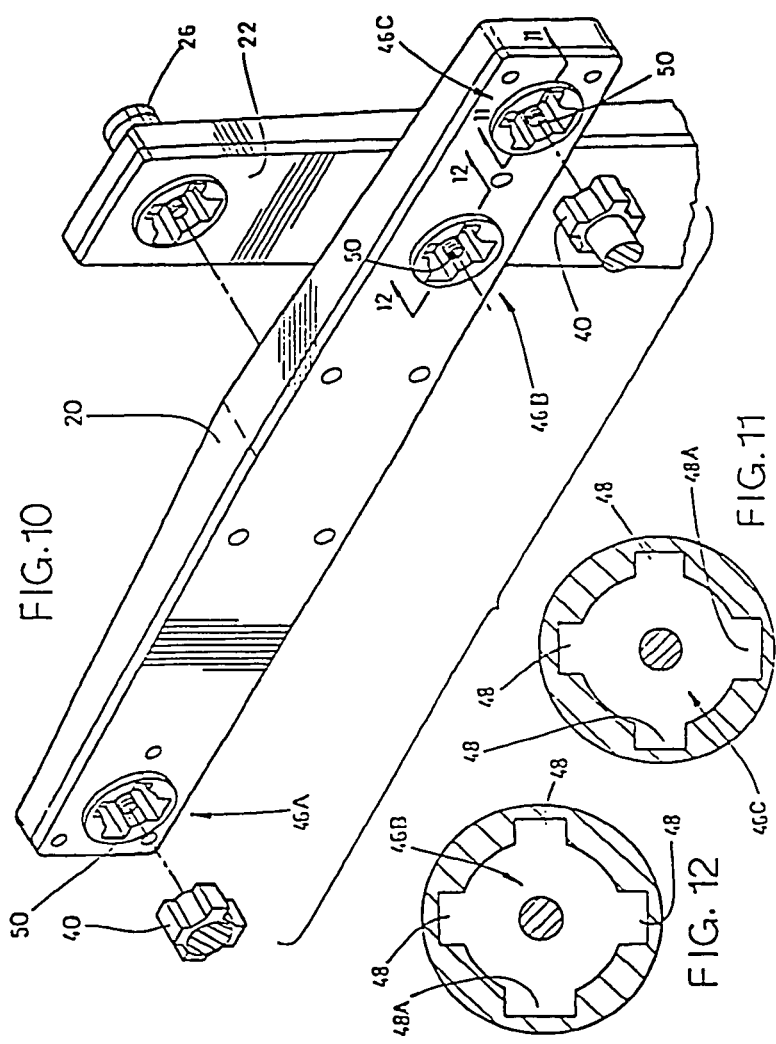

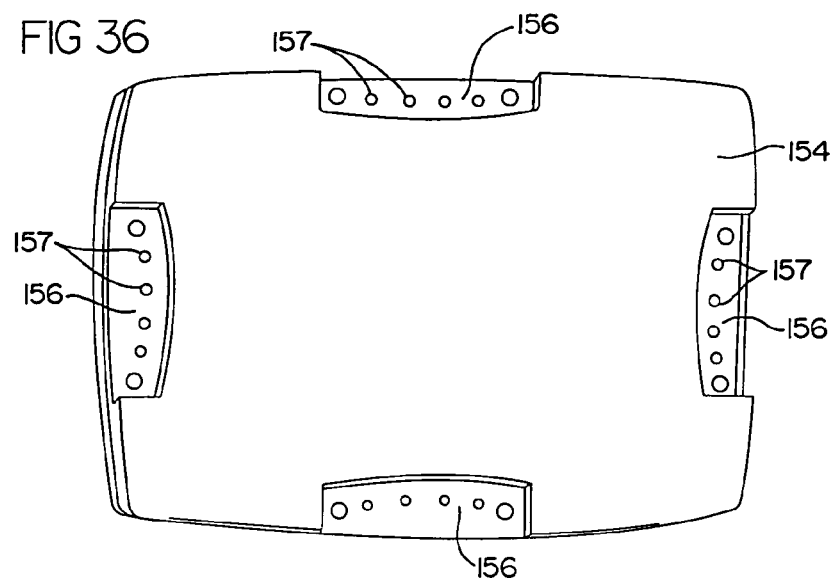
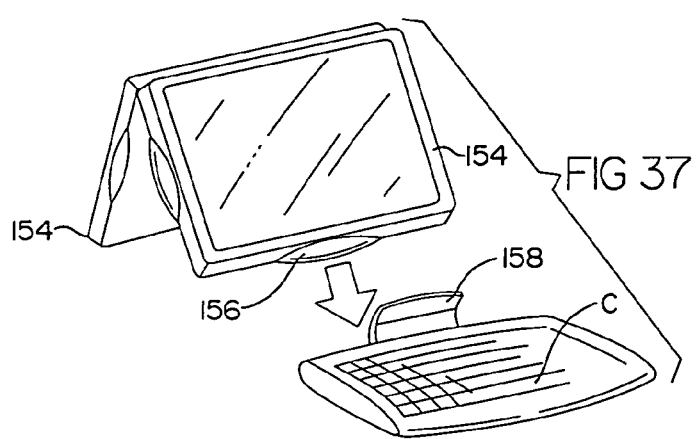
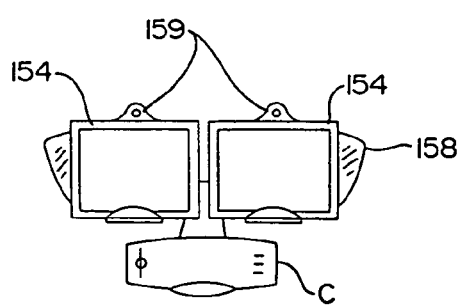
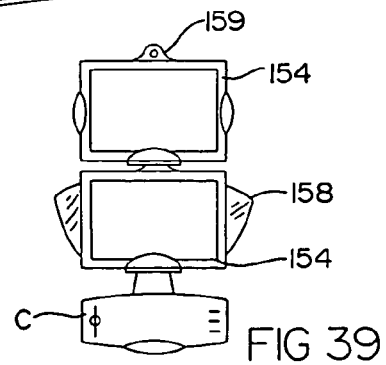

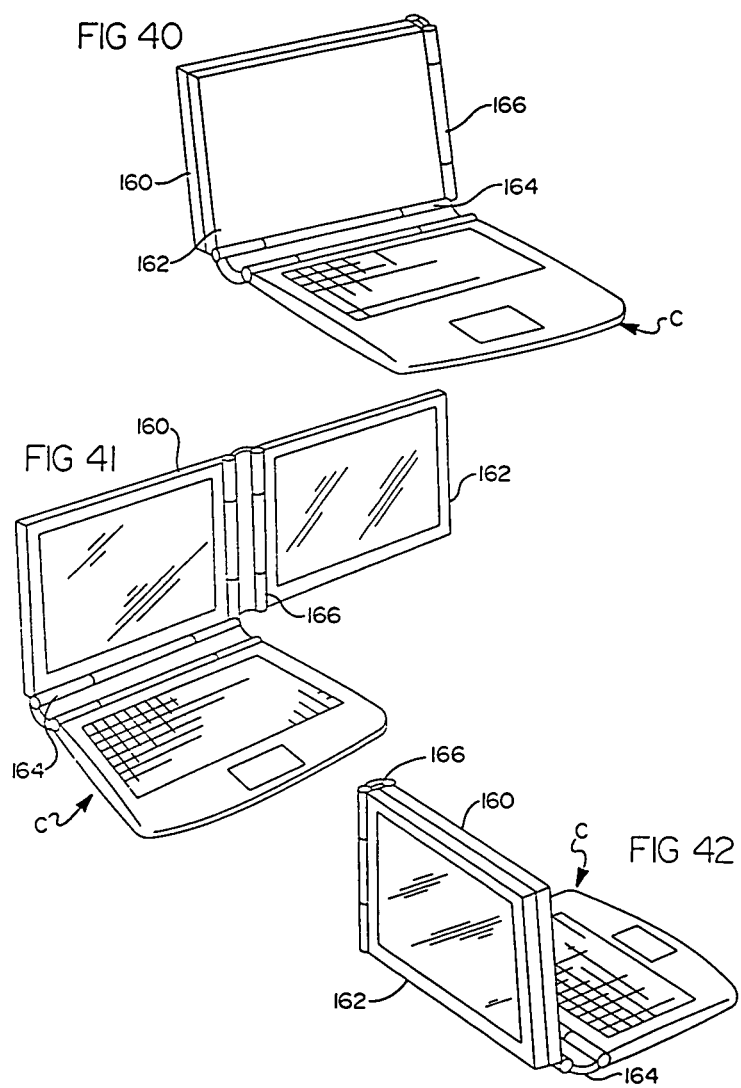

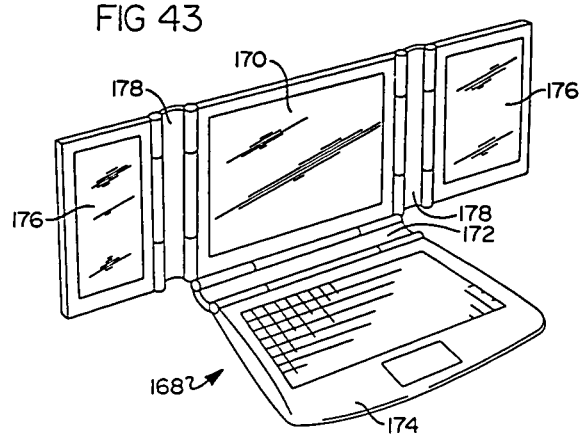
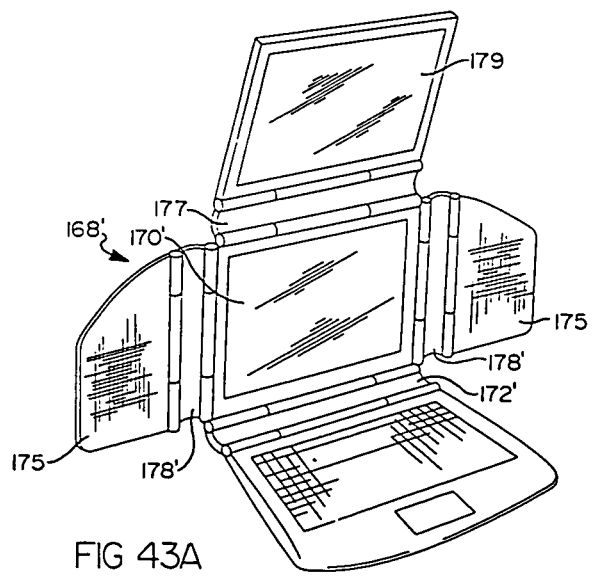

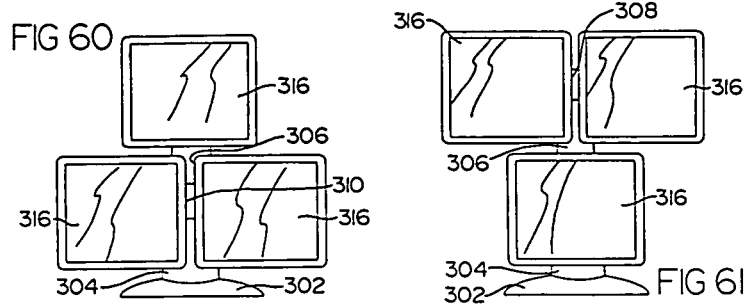
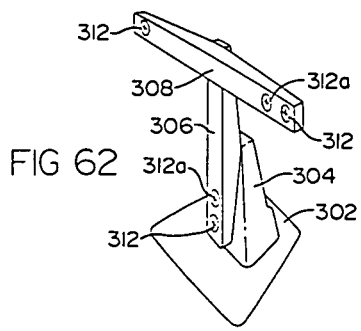
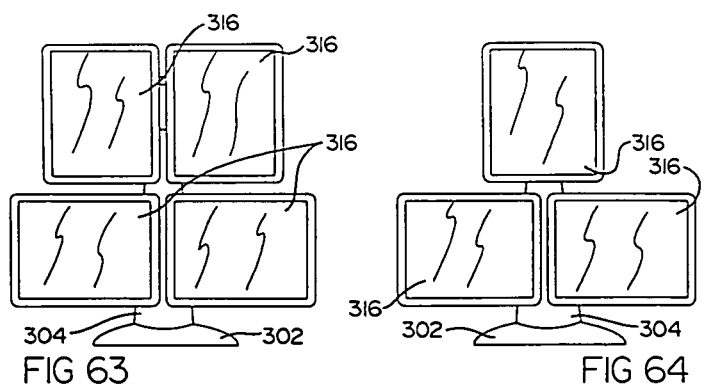

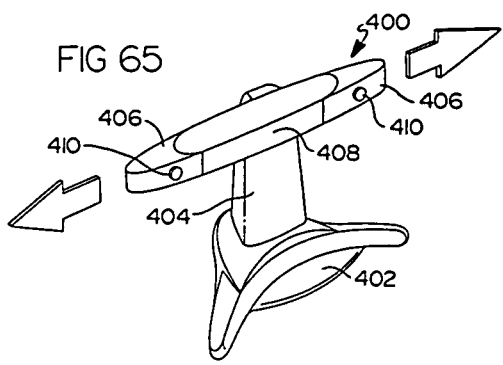
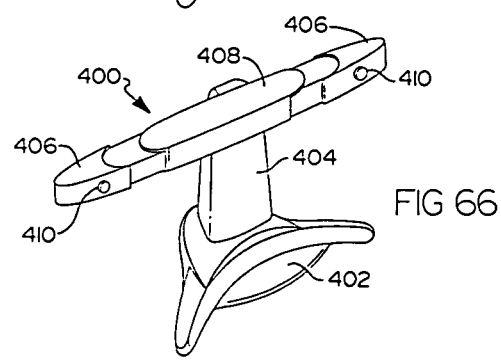
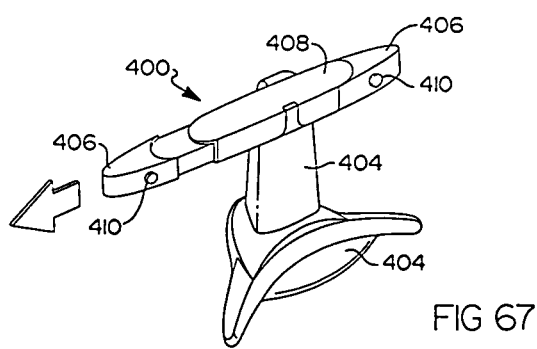

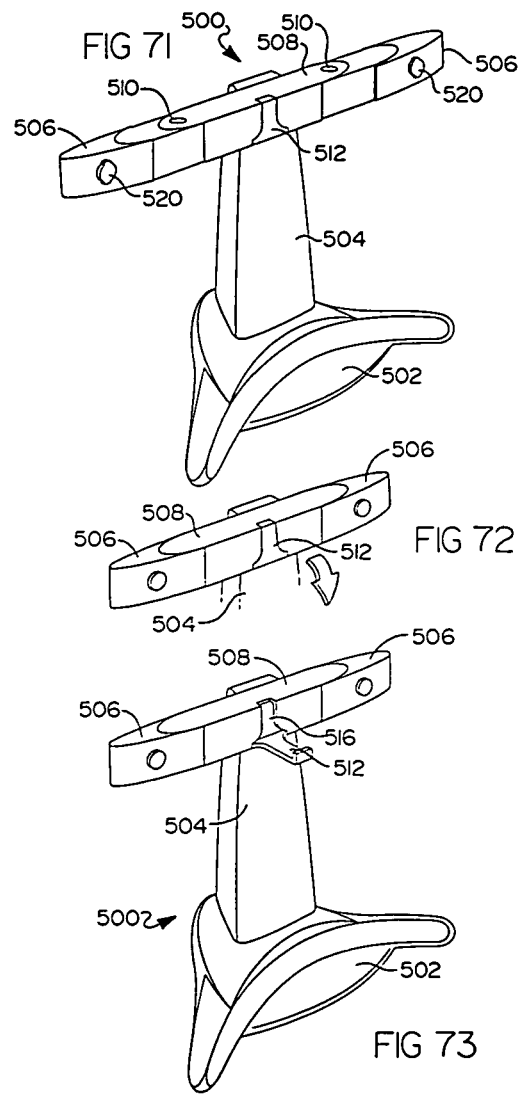

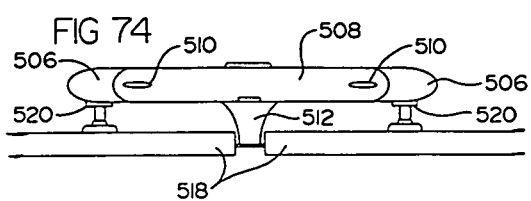
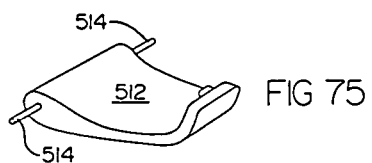
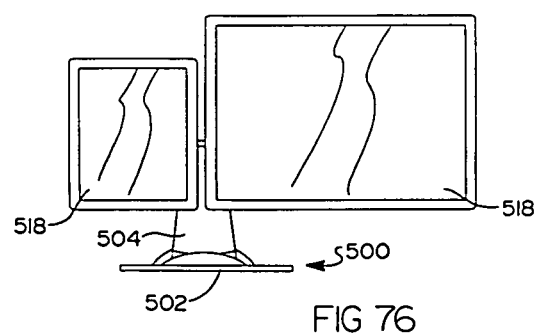

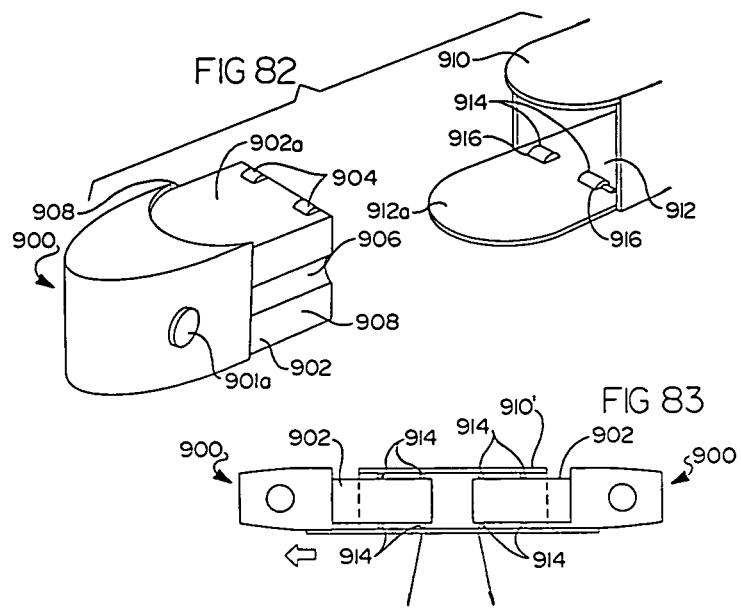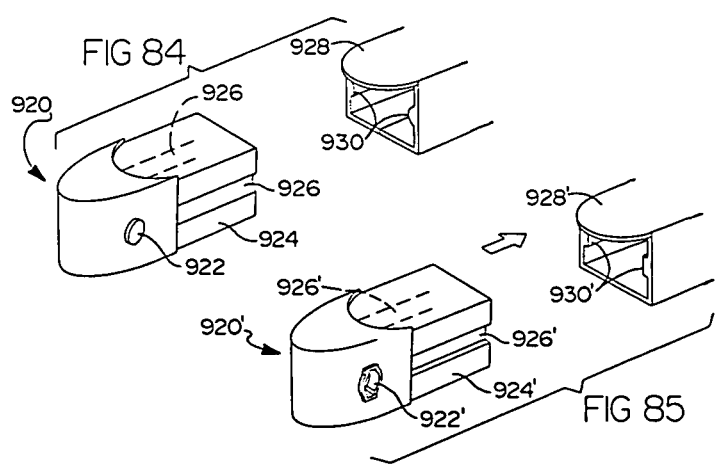

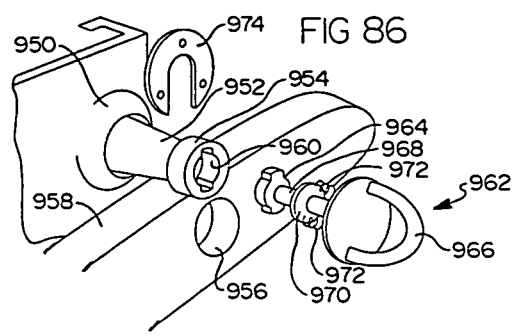
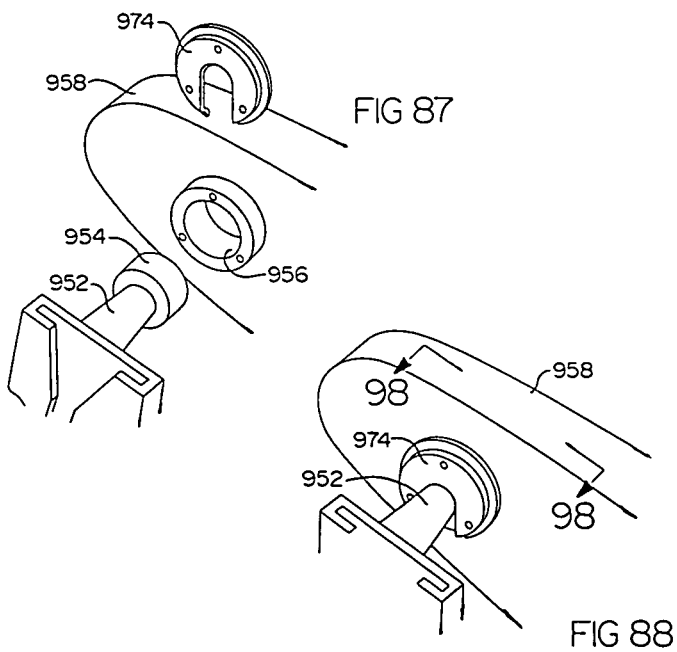

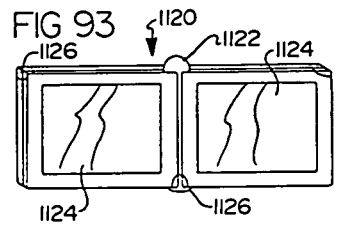
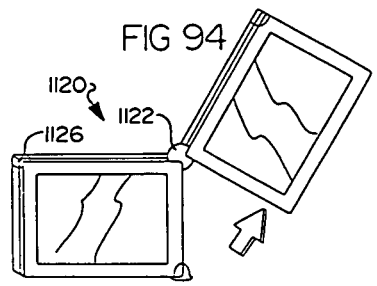
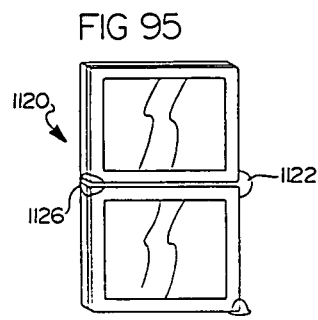
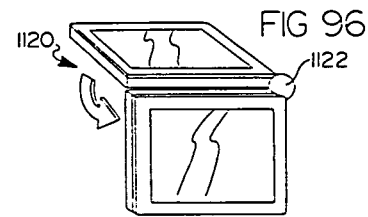
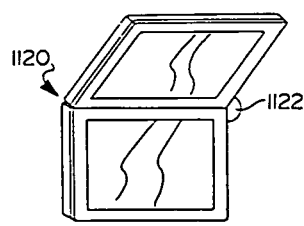
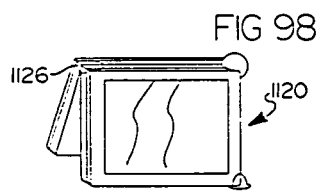
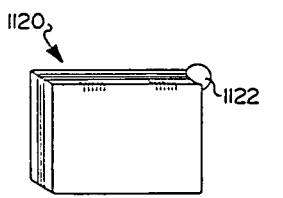

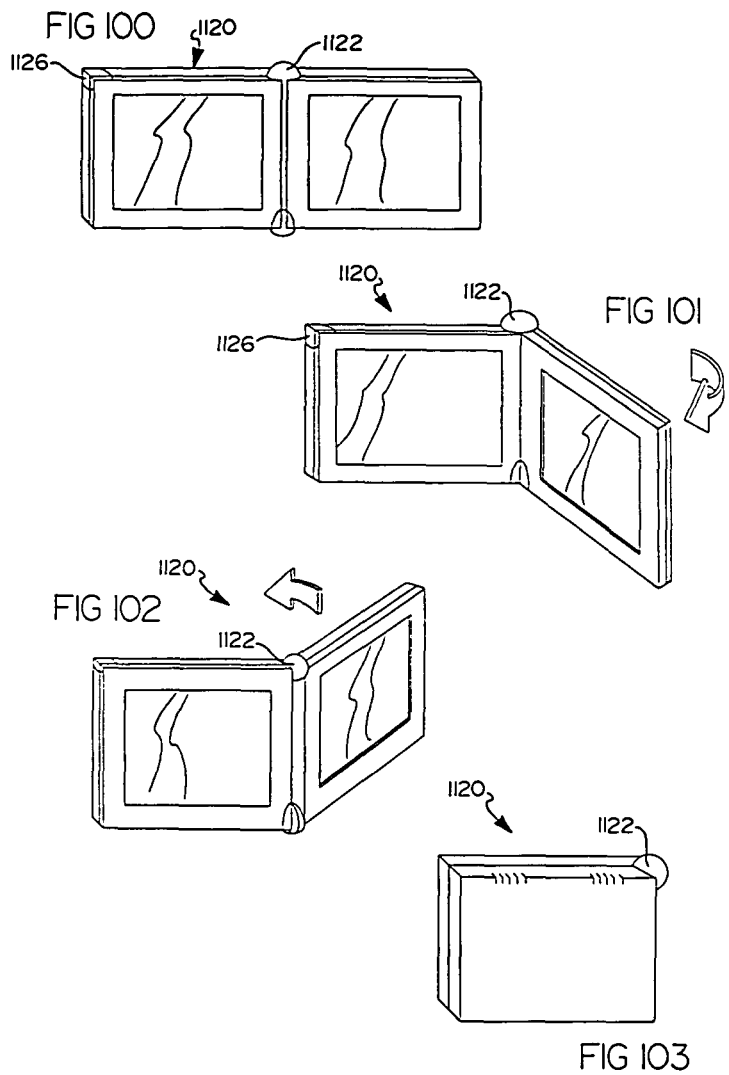

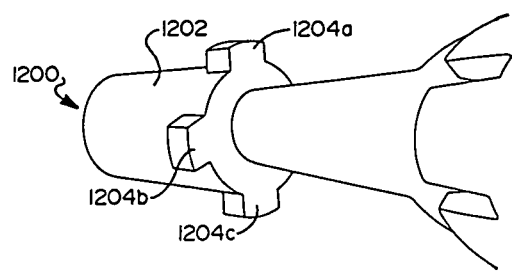
FIG 106
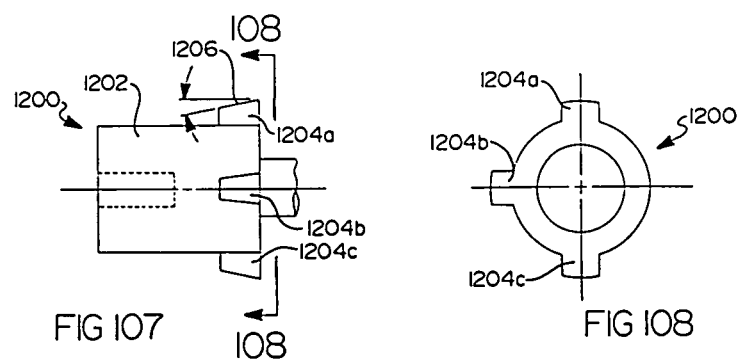
FIG 107
FIG 108

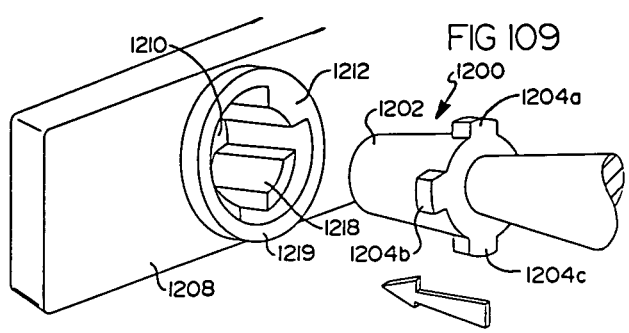
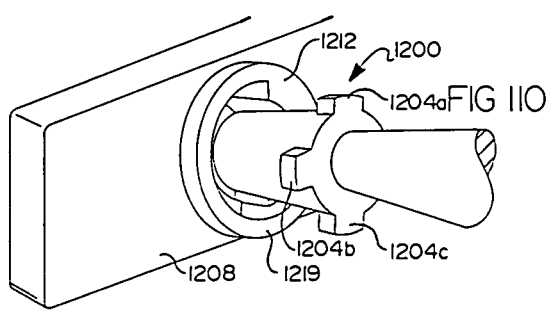
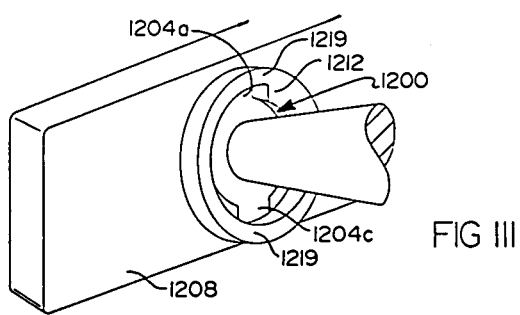

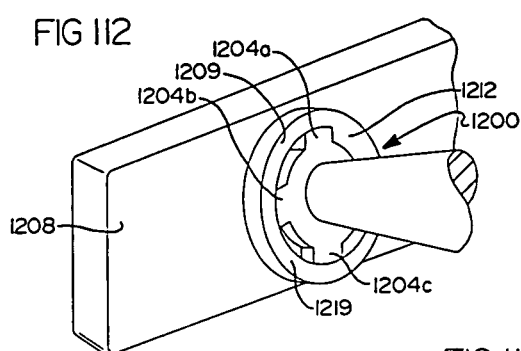
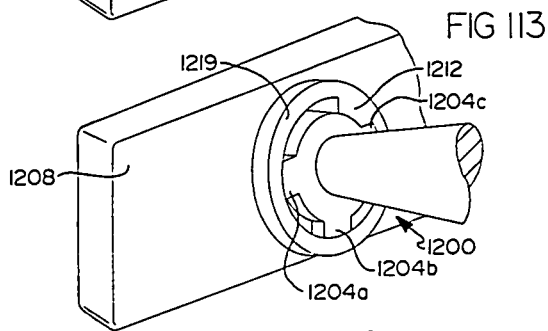
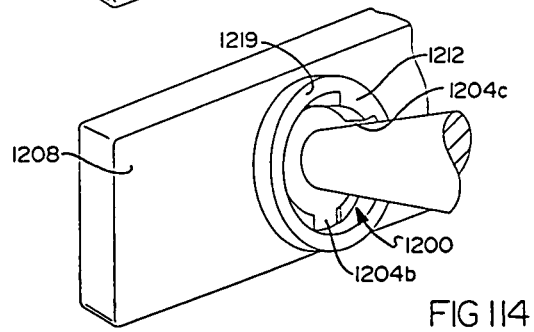

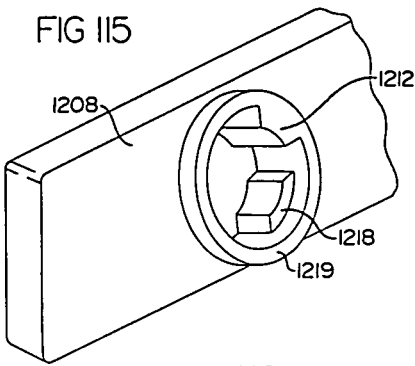
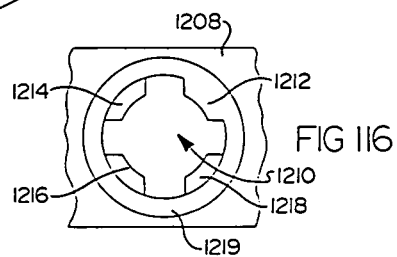
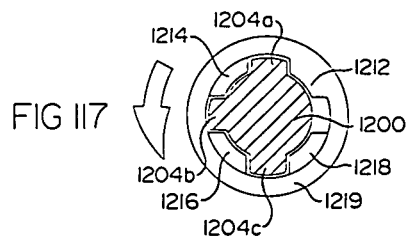
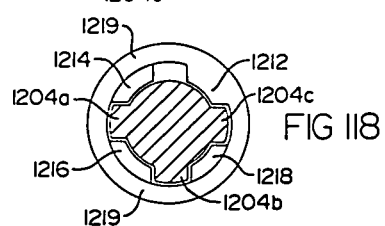

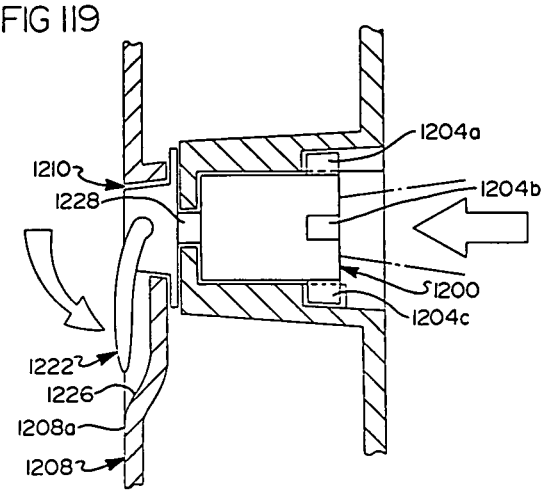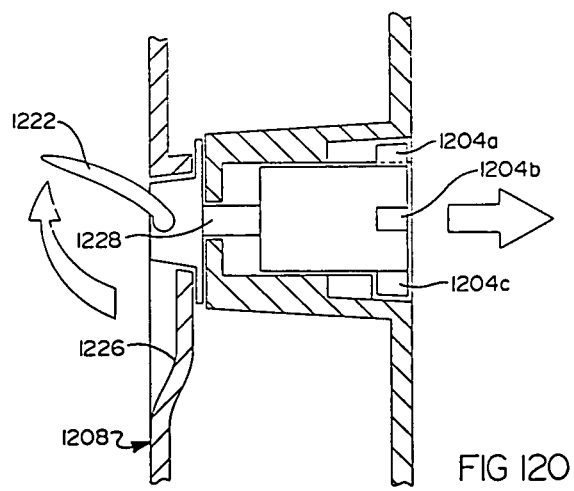

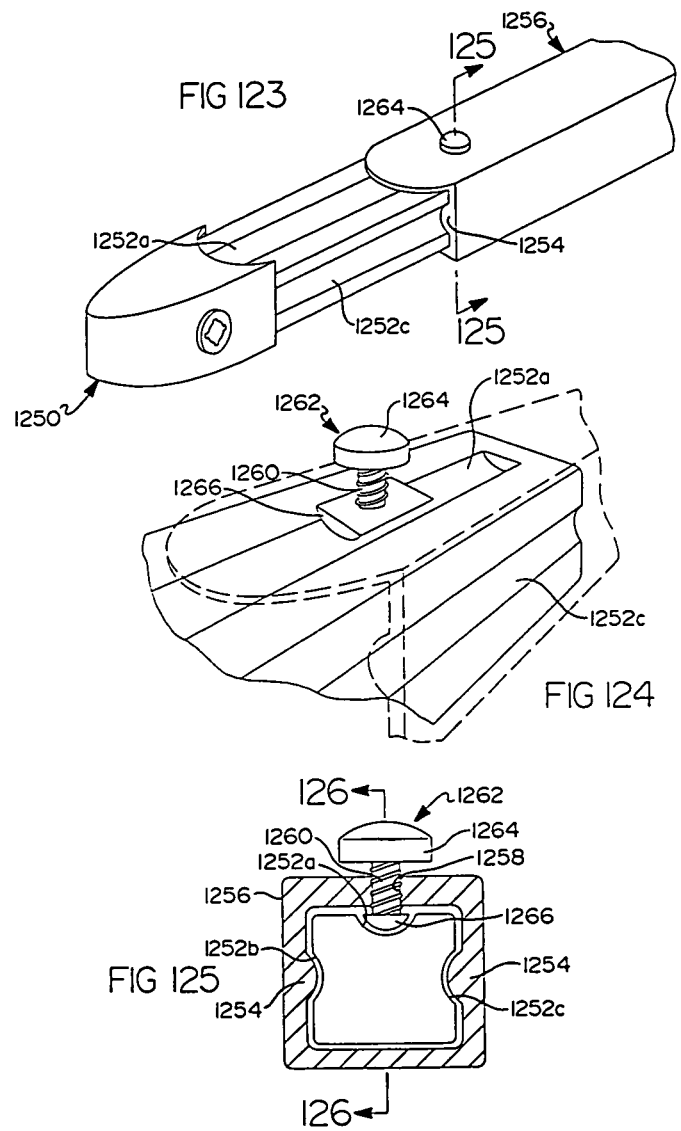

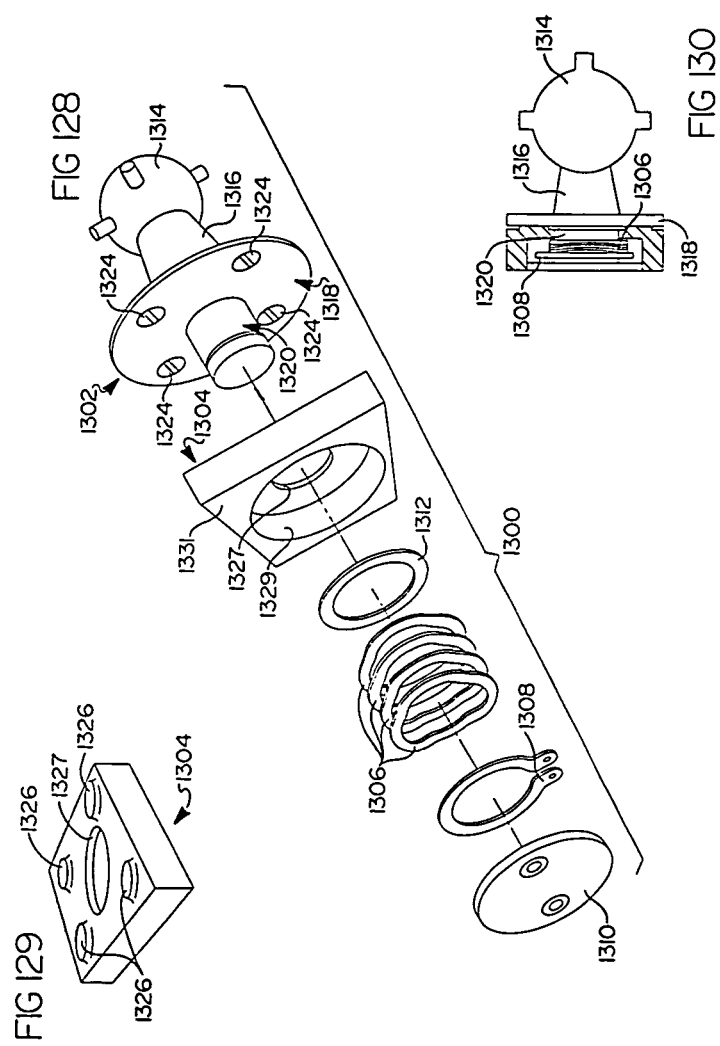

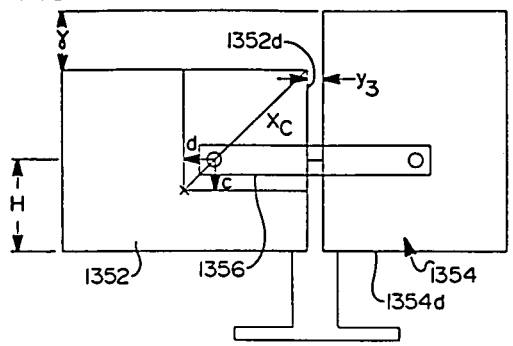
FIG 131
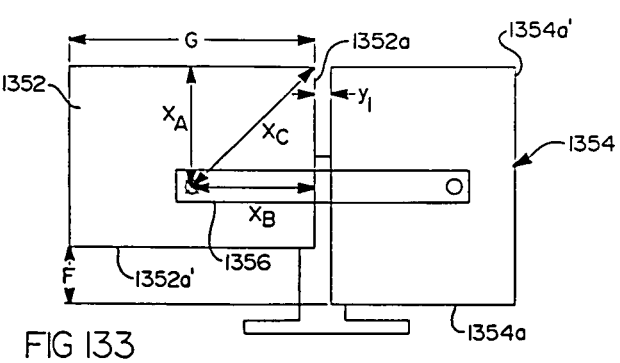
FIG 132
FIG 133

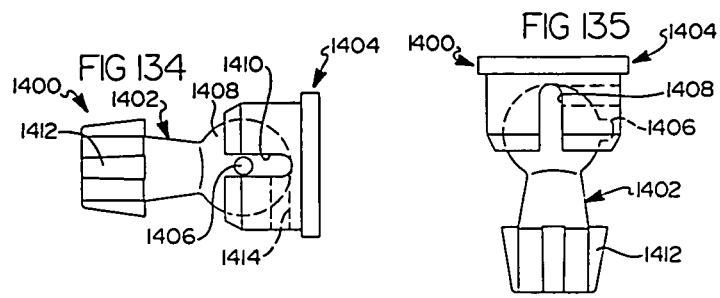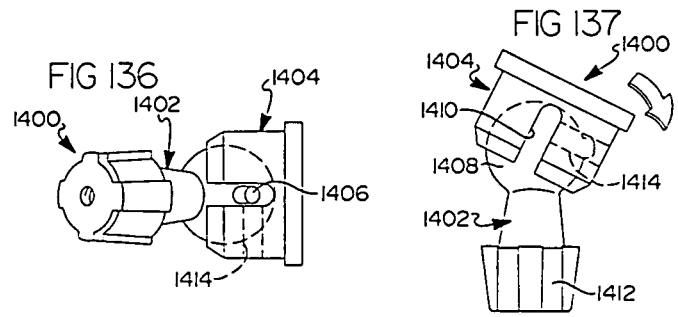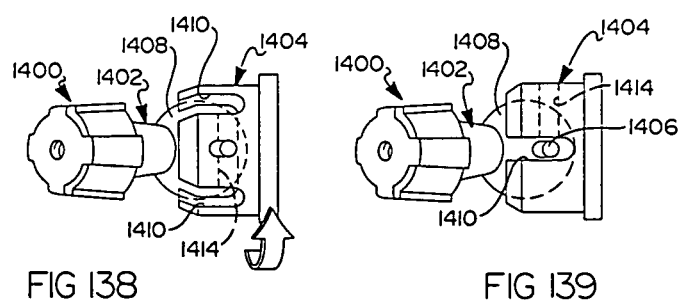

FIG 148
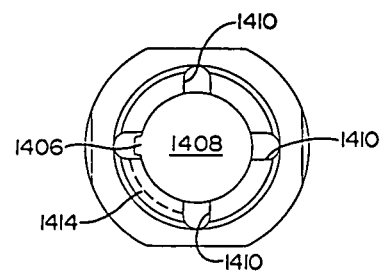
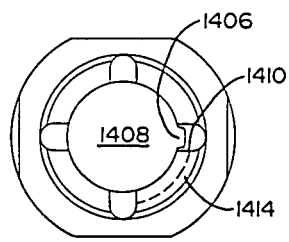
FIG 149

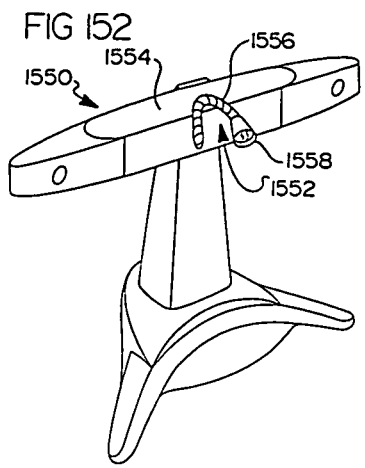
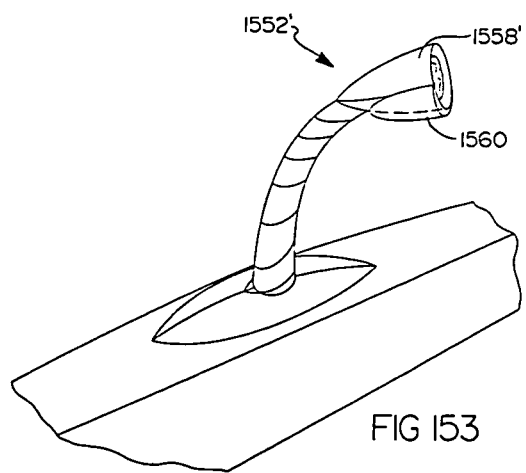

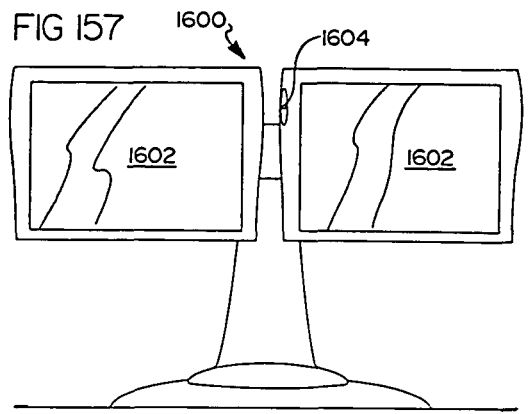
FIG 157
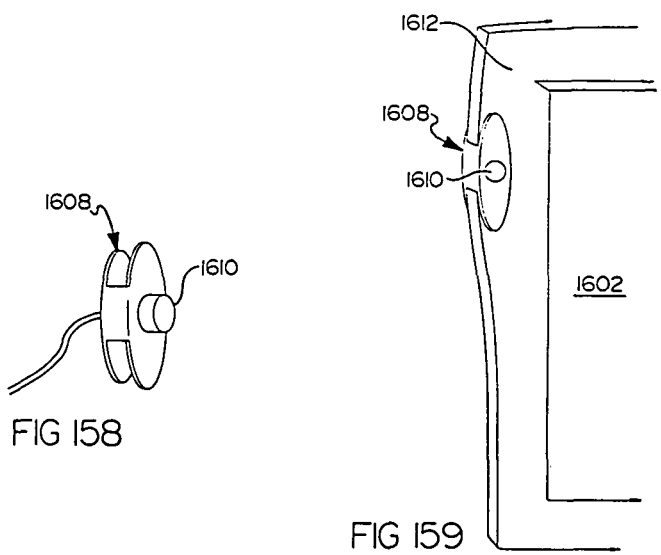
FIG 158
FIG 159

COMPUTER DISPLAY SCREEN SYSTEM AND ADJUSTABLE SCREEN MOUNT, AND SWINGING SCREENS THEREFOR

FIELD OF THE INVENTION

The invention relates generally to electronic displays having dual display screens used with computers and CAD design equipment, and more particularly to various embodiments of an LCD display system permitting positioning of two or more LCD display screens in a variety of orientations.

BACKGROUND OF THE INVENTION

Computers are readily adapted to operate multiple displays. Paired monitors and screens are useful when large amounts of related information, such as data or graphics, must be compared. Paired monitors can be inconvenient, however, where limited desk space is available. Monitors may be horizontally aligned, or vertically aligned. It is especially desirable to permit swinging of the monitor orientations together into a "booking" mode.

The invention also relates to a novel swingable mounting, which is suitable for mounting a variety of different pieces of equipment and instruments particularly for example video cameras, telescopes, mirrors, and any number of different articles, which it may be desired to swing into a position from which the article is not easily displaced.

The invention also relates to an interchangeable computer display screen, in which one or more of a variety of screen configurations can be connected or disconnected in various configurations with a computer.

BRIEF SUMMARY OF THE INVENTION

In one aspect, the invention provides a display system having two screens and comprising a base, a pair of electronic displays mounted on the base and means for swingably mounting the display screens, for swinging towards one another for convenient viewing. The swinging means includes an arm assembly which supports the display screens on the base. The support for the arm assembly from the base may have an orientation relative to the base in which the display screens are positioned in vertically stacked screen relationship and may also have a different orientation in which the display screens are positioned in a horizontal, side by side relationship. Each display screen has a swingable joint connecting it to the arm assembly to permit adjustment of its angular orientation relative to the other screen. The angular orientation of each of the display screens relative to the arm assembly can thus be set by the user so as to orient each display screen in the desired angular orientation for that operator.

In one implementation of the invention, the arm assembly can be set in one position about a generally horizontal axis relative to the base, and the display screens can be swung together relative to the arm assembly. The arm assembly may be locked in either orientations, typically vertical or horizontal. Each display screen may be permitted to swing only between a pair of angular positions relative to the arm assembly by controls in the swingable joints.

The displays will often be horizontally arranged side by side in their operative angular orientation. It will generally be desirable to minimize the spacing between edges of the display screens whether vertically registered or horizontally registered. To that end, the center-to-center spacing between the display screens is preferably reduced when the screens are swung together.

The swingable mounting joints connecting the display screens to the arm assembly are preferably formed in such a way that they can be preconfigured either for a side by side orientation or for a vertically stacked orientation of the screens, with means being provided on the swingable joints to guide the assembly in one fashion or the other, and the arm assembly is preferably provided with connecting means connecting to the swingable joints, which cooperate with the means guiding the assembly.

The swingable joints are preferably provided with control abutments by means of which the swinging of the displays can be guided and controlled both when in their horizontal side-by-side arrangement and when in their vertically stacked arrangement, and the position and angular displacement of the two screens can be preset by adjustment of such positional controls during assembly.

A further feature of the invention is the provision of a unique form of spring-loaded pivot mount for mounting equipment, such as the display screen. The pivot mount is capable of adjusting the spring pressure on the pivot so that the article mounted on the pivot mount, in this case a screen can be adjusted, when grasped with both hands and moved, but which is otherwise highly resistant to movement due to frictional locking of the pivot mount.

The pivot mount has numerous other uses, other than mounting display screens as will be apparent from the following description.

Further aspects of the invention provide for the interchangeability of screens one with the other, so that larger or smaller screens may be used with the same computer, and so that screens may be used in various different positions.

In some cases the screens may simply be stood on a table. In other cases the screens may be wall-mounted or mounted on some form of base separate from the computer. In other cases the screens may be interchangeably and releasably mountable for example in a vehicle, and they may be configured in pairs so that they may be portable and set up for a multi screen display, for example, for viewing by a number of persons simultaneously.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

The various advantages of the present invention will become apparent to one skilled in the art by reading the following specification and subjoined claims and by referencing the following drawings in which:

FIG. 4 is a top plan view of the dual display screens of FIG. 1;

FIG. 5 is a perspective illustration of dual display screen shown with the screens in vertical arrangement one above the other;

FIG. 6 is a side-elevation of FIG. 5 showing the screens tilted towards one another;

FIG. 10 is an exploded perspective illustration of an arm assembly, and showing cut away portions of the swingable joints;

FIG. 11 is a section along the line 11-11 of FIG. 10, showing the two components assembled;

FIG. 12 is a section along the line 12-12 of FIG. 10 showing the two parts assembled;

FIG. 30 is a perspective illustration of an alternate form of tripod display stand for holding three displays for example, on a conference room table or the like;

FIG. 36 is a rear perspective view of another form of display screen, showing attachment recesses for various components;

FIG. 37 is a perspective illustration of, for example, a lap top computer showing two display screens such as that illustrated in FIG. 36, being attachable to a hinge mounting on the computer;

FIG. 38 is a front elevational view of a pair of display screens as illustrated in FIG. 36 shown side by side;

FIG. 39 is a front elevational view corresponding to FIG. 38, but showing the two display screens one above the other;

FIG. 40 shows an illustration of a further embodiment of invention with a computer having two display screens joined along the side by a hinge;

FIG. 41 shows the computer of FIG. 40 with the two display screens swung out side by side;

FIG. 42 shows the same computer with the two screens swung back to back, so as to display in opposite directions;

FIG. 43 is a perspective view of a laptop computer system incorporating a center LCD panel and a pair of half-width LCD panels on each side thereof, wherein the half-width panels may be folded over the center LCD panel and the entire display portion then folded down onto the keyboard portion of the laptop to form a compact assembly;

FIG. 43A is a perspective view of a laptop computer which forms a multimedia center, and which incorporates a pair of foldable speakers flanking a lower LCD screen, and an upper LCD screen hingedly attached to the lower screen;

FIG. 60 is a front elevational view of three LCD panels supported on the display system shown in FIG. 59;

FIG. 61 is a front elevational view of three LCD panels being supported such that the single LCD panel is below an upper pair of LCD panels;

FIG. 62 is a perspective view of a base assembly for supporting three LCD panels in the configuration shown in FIG. 62;

FIG. 63 is a front elevational view of a four LCD panel system with two of the panels disposed in portrait orientation and two disposed in landscape orientation; and FIG. 64 is a front elevational view of a three LCD panel system with two LCD panels disposed in a landscape orientation and one in a portrait orientation.

FIGS. 65-67 illustrate perspective views of a display support system in accordance with one preferred embodiment of the present invention;

FIGS. 71-74 illustrate perspective views of an alternative preferred embodiment of the display support system of FIGS. 65-67, which incorporates a screen centering device for centering a pair of LCD screens on a support arm of the system;

FIG. 75 is a perspective view of the centering member of the system of FIG. 71;

FIG. 76 is a front elevational view of the display support system of FIGS. 71-74 supporting a pair of LCD screens of different dimensions;

FIG. 82 is a perspective view of a mechanism for enabling smooth extending movement of each of the arm members of the display support system shown in FIGS. 71-74;

FIG. 83 is a perspective view of an alternative preferred mechanism for enabling smooth rolling movement of the support arms within a common support member;

FIG. 84 is a perspective view of another alternative preferred form of the arm member incorporating semi-circular grooves and channels for smooth sliding movement of the arm members;

FIG. 85 is a perspective view of an alternative preferred embodiment of the arm member of FIG. 84 illustrating the use of square shaped channels and shoulder portions;

FIGS. 86-88 are perspective views of a display support system which enables an LCD screen mount to be quickly repositioned in either a portrait or a landscape orientation;

FIGS. 93-103 are perspective views of an LCD display system incorporating a universal ball joint hinge for enabling a pair of LCD screens to be placed in various orientations;

FIG. 106 is a perspective view of a release member in accordance with an alternative preferred embodiment of the invention;

FIG. 107 is a partial side view of the release member of FIG. 107;

FIG. 108 is an end view of the release member taken in accordance with directional arrow 108-108 in FIG. 107;

FIGS. 109-111 are perspective views of the release member being inserted into an associated support member;

FIGS. 112-114 are perspective views of the release member being rotated within the opening in the support member;

FIG. 115 is a perspective view of a portion of the support member of FIGS. 104-114;

FIG. 116 is a front view of a portion of the support member showing the opening therein in greater detail;

FIG. 117 is a partial cross sectional view illustrating the release member in one orientation within the opening in the support member;

FIG. 118 is a partial cross sectional view of the release member having been moved 90 degrees counterclockwise from the position shown in FIG. 117;

FIG. 119 is a partial cross sectional side view of the release member coupled to a lever assembly associated with the support member, with the lever assembly locking the camming member in place relative to the support member;

FIG. 120 illustrates the lever assembly shown in FIG. 119 in an unlocked orientation, thereby enabling rotational movement of the release member;

FIG. 123 is an alternative preferred embodiment of an arm assembly of the present invention incorporating a threaded locking member for locking the arm member relative to an associated support member;

FIG. 124 is an enlarged perspective view of a portion of the arm member within the support arm, and with the support member shown in phantom;

FIG. 125 is a partial end cross sectional view taken in accordance with section line 125-125 in FIG. 123;

FIG. 128 is an exploded perspective view of an alternative preferred embodiment of the present invention incorporating a ball joint assembly adapted to be easily adjusted to four different positions on a support member;

FIG. 129 is a perspective view of the mounting block shown in FIG. 128;

FIG. 130 is an assembled side cross sectional view of the assembly shown in FIG. 128;

FIGS. 131-133 illustrate dimensional considerations for mounting two LCD screens such that various edges of each align with each other when the two screens are in different orientations;

FIG. 134 is a perspective view of a ball joint assembly in a first configuration;

FIG. 135 is another perspective view of the ball joint assembly of FIG. 134 in the first configuration;

FIG. 136 is a perspective view of the ball joint assembly of FIG. 134 in a second configuration corresponding to the screen angled outwardly;

FIG. 137 is another perspective view of the ball joint assembly of FIG. 134 in the second configuration;

FIG. 138 is a perspective view of the ball joint assembly of FIG. 134 in a third configuration corresponding to the screen being rotated in a position between landscape and portrait orientations;

FIG. 139 is a perspective view of the ball joint assembly of FIG. 134 in a fourth configuration corresponding to an orientation different from that of the first configuration;

FIG. 148 is a partial cross-sectional view in accordance with section line 148-148 in FIG. 147 of the ball joint assembly of FIG. 134 in use with the leftmost LCD screen in FIG. 147;

FIG. 149 is a cross sectional view in accordance with section line 149-149 of FIG. 147 of the ball joint assembly in use with the rightmost LCD screen in FIG. 147;

FIG. 152 is a perspective view of a display system incorporating a flexible camera mounted in a support arm thereof;

FIG. 153 is a perspective view of an alternative preferred embodiment of the camera of FIG. 152 but also including a microphone integrated therewith;

FIG. 157 is a front view of an alternative preferred embodiment of an LCD display system incorporating a camera built into the bezel of one of the LCD screens thereof;

FIG. 158 is a perspective view of a clip incorporating a camera which can be secured to a bezel of an LCD screen; and FIG. 159 is a partial perspective view of an LCD screen incorporating the clip attached to the bezel of the screen.

DESCRIPTION OF A SPECIFIC EMBODIMENT

As already explained, the invention in this particular embodiment illustrated, has its application to the use of dual display screens, which can be used to display two different computer images simultaneously. This may have application for example in CAD computer design application. For these and other purposes it is particularly useful if the two screens or displays can be tilted towards one another so that they appear in the form more or less of two pages of an open book. The screens are preferably arranged side by side, in horizontal alignment, but may also be arranged vertically one above the other.

Figure 1:
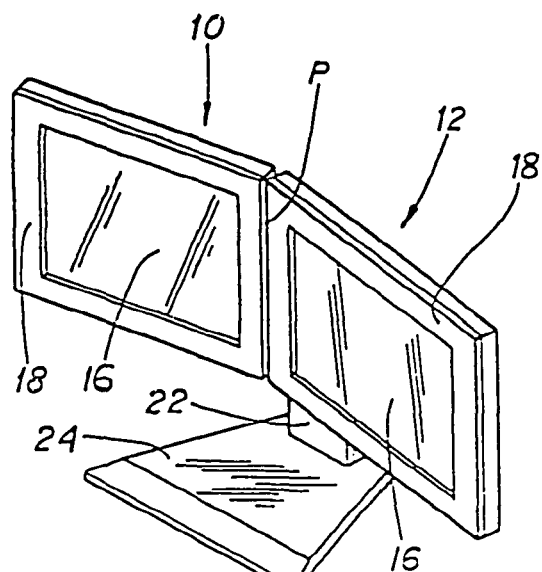
FIG. 1 is a perspective illustration of a dual display screen system, showing swinging movement of the two screens towards one another.
Figure 2:
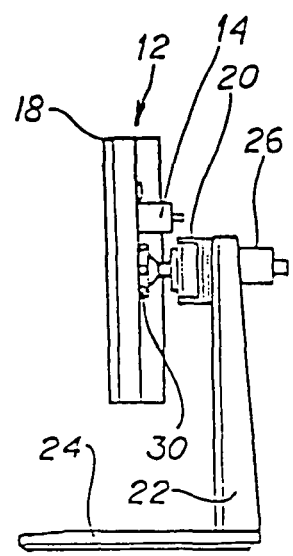
FIG. 2 is a side-elevation of FIG. 1.
Figure 3:
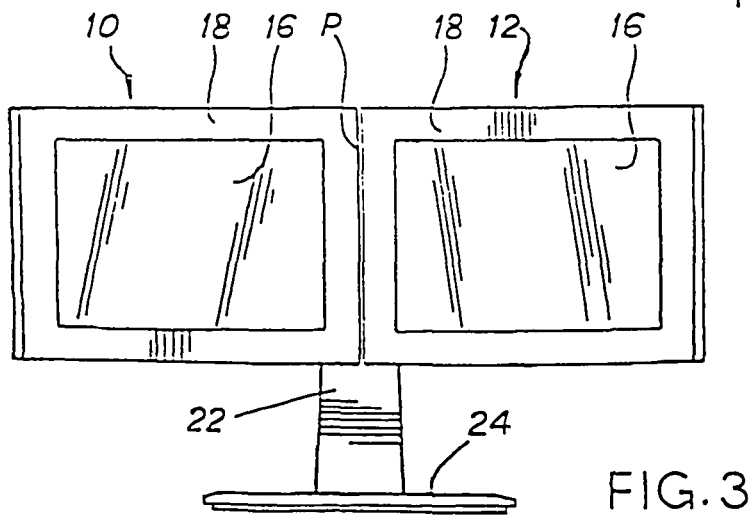
FIG. 3 is a front-elevation of the dual display screens of FIG. 1.

Referring now to FIGS. 1, 2 and 3, the invention is there illustrated as in the form of a pair of video display screens 10 and 12, each of which may be of known construction, but which may typically be liquid crystal displays for example. They are each provided with video terminal connectors 14 (FIG. 2) by means of which they may be connected to a computer.

Each of the screens 10 and 12 comprises a central rectangular display portion 16, and a rectangular marginal frame 18.

The two display screens 10 and 12 are mounted at opposite ends of a mounting arm 20. The mounting arm 20 is itself supported on an upright stand 22 and a base 24. The arm 20 may be connected to the base 22 by a coupling means 26 (FIG. 4) by means of which the arm may be attached during assembly, either horizontally, or vertically (FIG. 6) prior to delivery to the customer.

In some cases the manufacturer may simply make the arm permanently attached in one position, i.e. horizontal or the other i.e. vertical, to reduce expense.

As will be noted in FIGS. 2 and 4, each of the displays 10 and 12 is mounted on respective free ends of arm 20, by means of a swingable mounting means 28 and 30 respectively.

The swingable mounting means 28 and 30 are so constructed as to permit the two screens 10 and 12 to be swung together towards one another, into the configuration shown in FIGS. 1 and 4, in which they both remain in the same upright planes, and in which they are both swung towards one another by equal angles. In this way, as the two screens 10 and 12 are swung towards one another into this configuration, the angular displacement of one screen is equal to the angular displacement of the other screen, so that the two frames 18 of the screens 10 and 12 substantially meet at a central point indicated generally as P, thus bringing the two screens 16-16 as close as possible together and at the same time, as far as possible, simulating the appearance of two pages of a book opened up.

It will be observed that when the arm 20 is fastened in its vertical position as shown in FIG. 5, the lower one of the two screens 10 and 12 is moved up the arm, because in the vertically stacked orientation, the rectangular screens have a shorter vertical dimension, and it is desirable that they should be as close to one another as possible when they are swung together, so that the longer sides meet at point P.

From the foregoing description it will be understood that it is desirable that the two screens can be swung together into their inwardly angled relation as shown in FIGS. 1 and 4, or FIG. 6, but that the screens should be capable of being tilted only to a limited degree in any other direction relative to one another, since this might reduce the clarity of the dual display. However, the two screens may be tilted slightly upwardly, or downwardly by similar angular displacements. In this way the simulation of an open book arrangement is maintained.

For these reasons, the two display screens 10 and 12 are mounted on the arm 20 by means of the swingable mountings 28 and 30. These mountings will now be described in greater detail with regard to FIGS. 7, 8 and 9.

Figure 7:
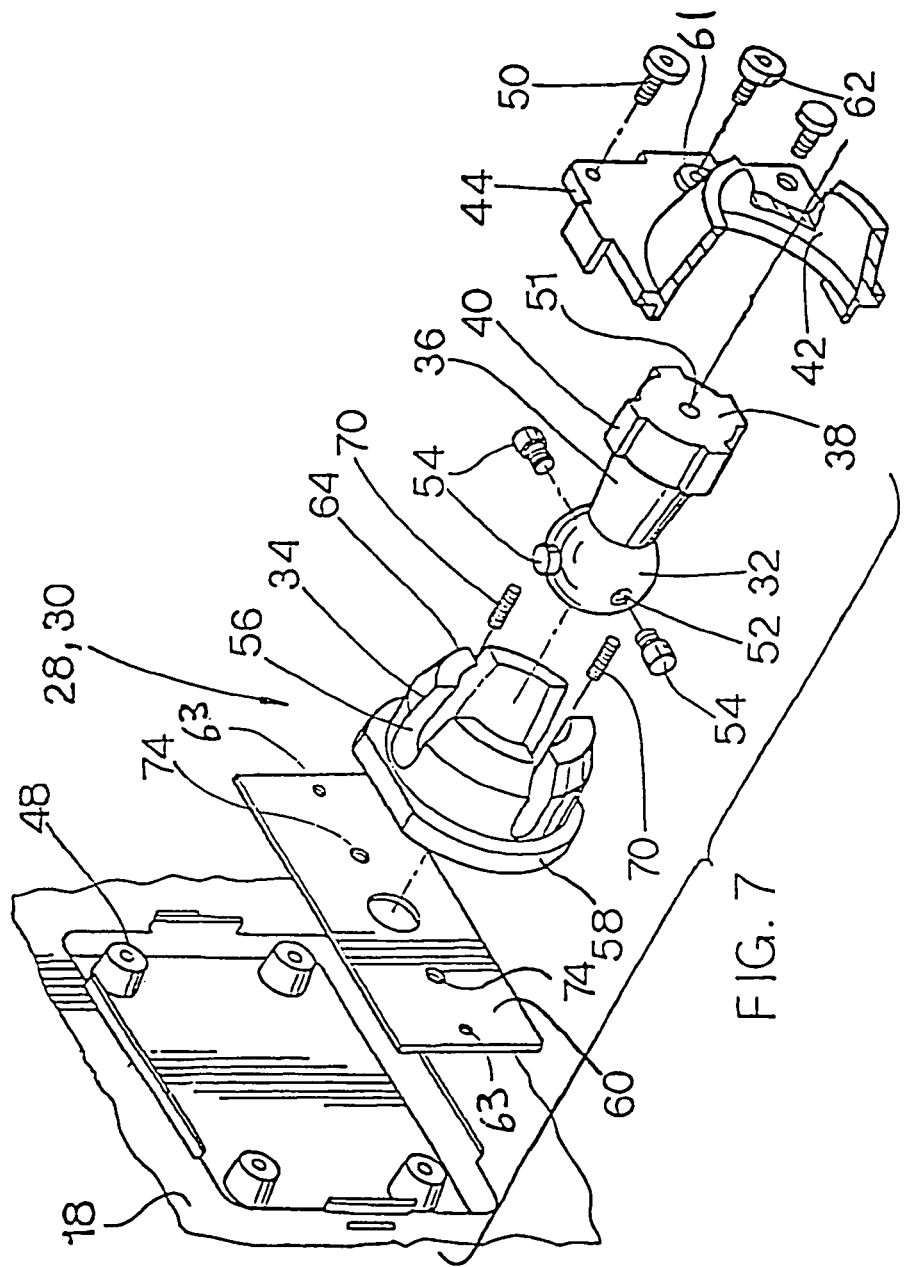
FIG. 7 is an exploded view of the pivot mount and ball joint used in this embodiment of the invention.
Figure 8:
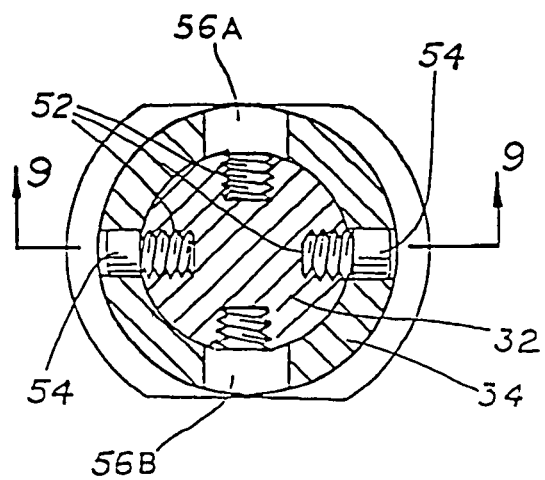
FIG. 8 is a section along the line 8-8 of FIG. 7.

FIG. 7 illustrates the mounting 28 or 30 in an exploded perspective view. The swingable joint consists essentially of a ball 32, and a socket 34, with the ball 32 being preferably cast out of a suitable material preferably a metallic material and the socket 34 being cast preferably of a somewhat resilient material such as a thermoplastic. The ball 32 is mounted on a neck 36, which extends from a generally rectangular junction block 38. The block 38 is formed with a plurality, in this case four, rectangular guide members 40, spaced apart at 90 degrees from one another around the block 38.

One of the guide members 40A, is wider than the other three guide members 40, to provide guidance when the guide members are assembled in a manner to be described below.

The block 38 and guide members 40 are designed to fit into suitable recesses in the arm 20 (described below).

A collar member 42 of generally semi-arcuate shape, is designed to fit over the block 38 and around the socket 34, for reasons to be described below. Collar 42 is formed with fastening flanges 44 by means of which it may be secured in position as described below.

In this particular embodiment, the arm 20 is provided at each end with three mounting recesses 46A, 46B and 46C. Each mounting recess 46 has four channel shaped grooves 48 formed therein spaced at ninety degrees therearound. The channel shaped grooves 48 are intended to receive the rectangular guide members 40 of the swingable joints.

One of the guide channel grooves 48A is wider than the others, to receive the wider one 40A of the rectangular guide members. In this way the guide members provide a keying function, which controls the positioning of the swingable joints and the display screen.

Bolts 50 align with the blocks 38, and are received in suitable threaded bores 51 (FIG. 7) and secure the assemblies in position.

The ball 32 is provided with a plurality, in this case four screw receiving bores 52, adapted to receive screws 54 therein. The sockets are spaced around the widest part of the ball 32, and are radially spaced apart by 90 degrees from one another. It will be appreciated that while there are four such bores 52, in certain circumstances only two or three screws 54 will be inserted, for reasons to be described below.

The heads of the screws 54 are cylindrical and protrude outwardly from the ball 32, and are received in respective slots 56 formed in socket 34. The ball 32 is a snug frictional fit within the interior of socket 34, so that a significant twisting moment is required to rotate the ball within the socket.

Clearly depending on the number of screws 54 in position, the actual movement of the ball in the socket is restricted. Thus for example if there are three such screws 54 in position, two of the screws 54 will simply limit the movement of the ball 32, so that the ball 32 can virtually be moved only around the axis of the two screws 54. If a third screw 54 is inserted then it will restrict movement of the ball so that it can be rotated only in such a fashion that the screw 54 rides along its respective groove 56, but that it will not be able to move significantly in the reverse angular direction.

For reasons to be described below, two of the slots 56A and 56B are wider and the other two slots 56 are narrower.

Figure 9:
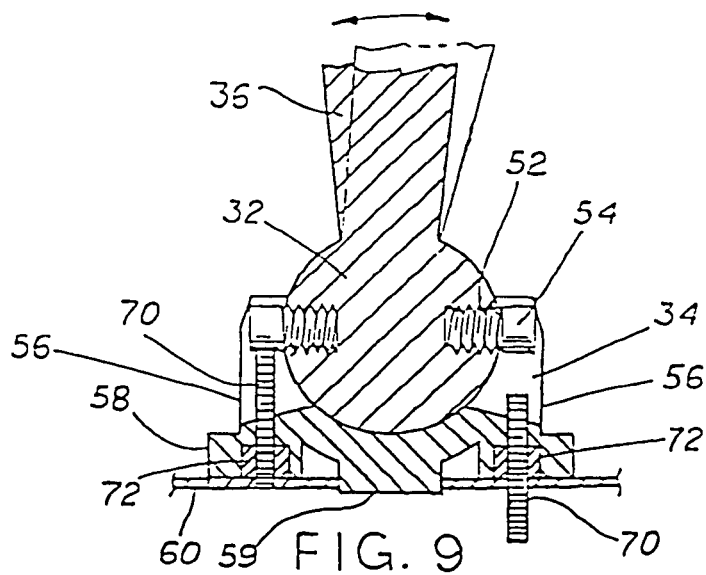
FIG. 9 is a section along the line 9-9 of FIG. 7.
Figure 13:
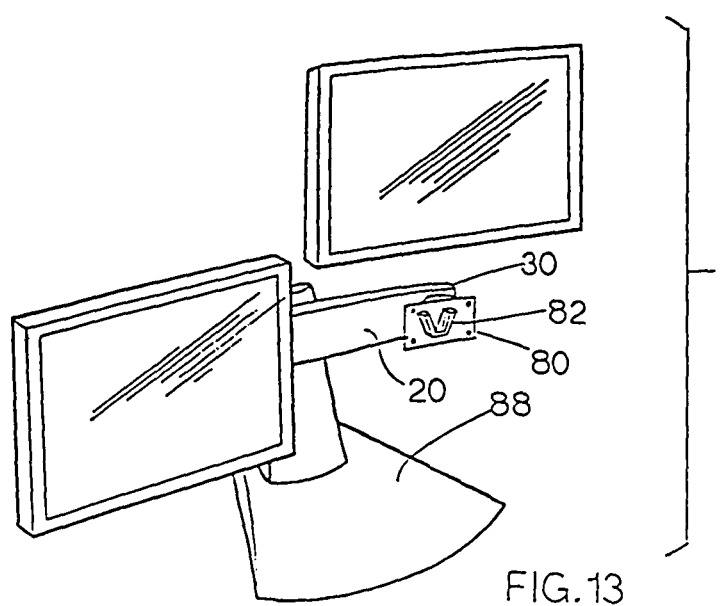
FIG. 13 is a perspective partly exploded illustration showing an alternative interchangeable mounting system for mounting the screens.
Figure 14:
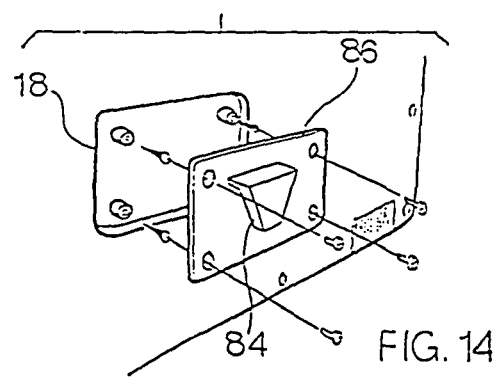
FIG. 14 is an exploded rear perspective illustration of a complementary portion of the mounting system, which is fitted to the back of each screen.
Figure 15:
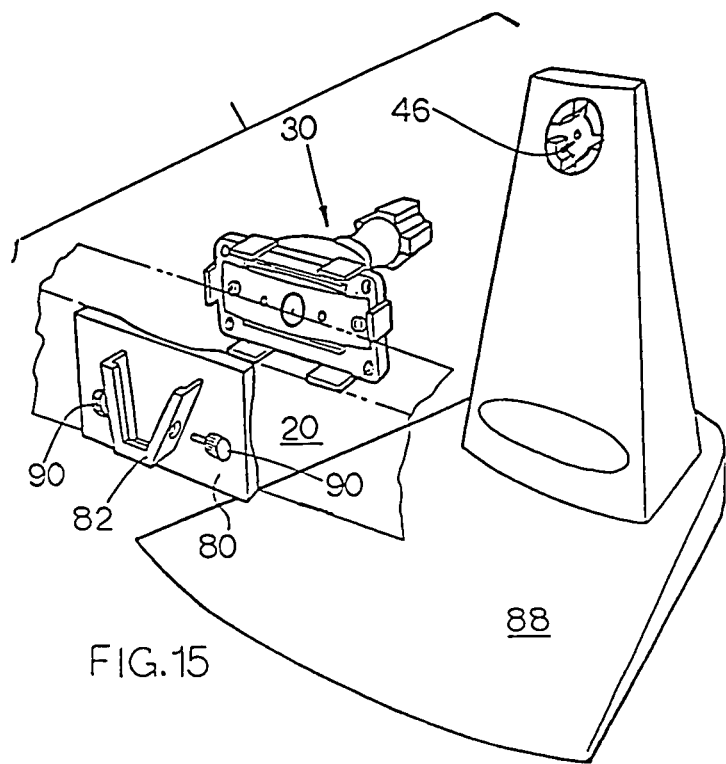
FIG. 15 is an exploded perspective illustration showing the interchangeable mounting system of the invention coupled with a ball joint similar to that shown in FIG. 12, to enable a screen to be mounted on a stand separately from the computer.
Figure 16:
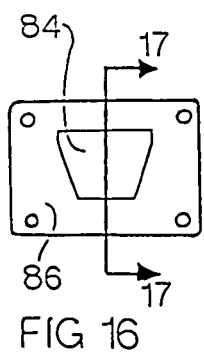
FIG. 16 is a rear elevation of the complementary portion of the interchangeable mounting system mounted on the back of a screen.
Figure 17:
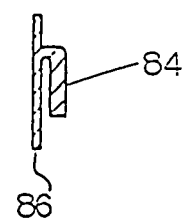
FIG. 17 is a section along the line 17-17 of FIG. 16.
Figure 18:
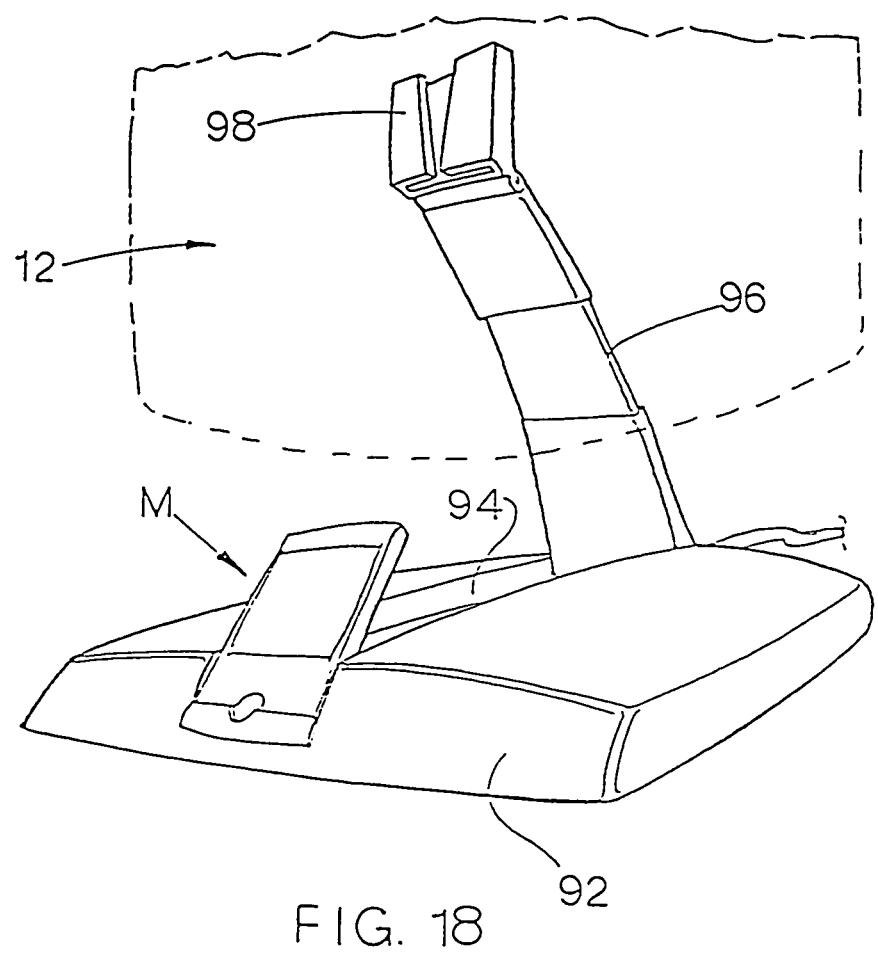
FIG. 18 is a perspective illustration partly in phantom of a modified form of stand for a computer screen.

The socket 34 has a generally annular base 58, and a spring loaded plate 60 abuts against the annular base 58. The shape of the socket 34 is such that a small cylindrical boss 59 project through a registering opening in the spring plate 60, (FIG. 9).

The spring plate 60 is secured in position by means of screws 62 passing through suitable registering openings 61 on the flange 44 of the collar 42, and secured in threaded openings 63 in plate 60.

By tightening or loosening the screws 62, it is possible to apply greater or lesser pressure by flexing the plate 60 against the rear surface of socket 34, and thus adjust the friction between the surface of the ball 32 in the socket 34. In this way it is possible to preset the rotational force or torque that would be require to rotate the ball in the socket.

Additional control of the friction on the ball is provided by means of the frusto-conical collar 42. This mates with frusto-conical bevels 64 on the exterior of collar 34. Thus by tightening or loosening the screws 50 in the sockets 48, the collar 42 can be made to squeeze and wedge the four sides of the socket 34 together tightly around the ball 32 and thus still further control the friction applied by the socket 34 to the ball 32.

In order to further control and limit the swinging of the ball 32 and stem 36 relative to the socket 34, limiting screws 70-70 are provided, which can be inserted or removed in suitable threaded inserts 72-72 in annular base 58 of socket 34.

One or more such screws 70 can be inserted (FIG. 9) and can be adjustably positioned, so as to abut against the cylindrical heads of screws 54, and thus limit swinging of the ball 32.

Access to screws 70 can be obtained through registering opening 74 in plate 60.

As mentioned, all of these settings would be preset in the factory before shipment, so that in use the actual scope of movement of the display screen, by means of rotating the ball 32 in the socket 34 is substantially restricted or limited.

It will thus be seen that the novel ball and socket joint described provides a great degree of control on the angular position of the article attached to it, in this case the screens 10 or 12. In fact, by suitable adjustments in the factory, the friction on the ball 32 can be made sufficiently tight that it is substantially impossible to manually move the arm 36 on which the ball 32 is mounted, simply by grasping the block 38.

However, the friction can be so adjusted that by grasping the two edges of the display screen, the position of the display screen can be manually adjusted to the most suitable position, and once adjusted it will remain substantially fixed in that position.

Thus, once the block 38 is inserted in position in its socket in the arm, and locked in position, then by grasping the two side frames of the screen, sufficient torque can be applied, to adjust the position of the screen and rotate the ball 32 in the socket 34 until the screen is in the desired position.

In accordance with various further embodiments of the invention as illustrated in FIGS. 13 through 29, the invention provides for a still greater range of interchangeability either as between one screen and another screen for computer, which may facilitate either the use of a small portable screen or a much larger screen, or the use of a plurality of screens, or the ready interchangeability of simple forms of screen mountings.

FIGS. 13, 14, 15 and 16 indicate one form of interchangeable screen attachment, being a further embodiment of the ball and socket joint as illustrated in FIGS. 7 through 12. In this further embodiment, a modified form of plate 80 is secured to the ball and socket joint 28-30. The plate 8 in this case is formed with a generally V-shaped socket 82, the edges of the V-shaped socket being formed with flanges. A complementary attachment plug 84 is mounted on a plate 86 which is secured to the back of the screen 18. In this embodiment the arm 20 is shown mounted on an independent base stand 88, and the actual computer and keyboard may be located elsewhere and simply connected by suitable coupling cables (not shown) so that the entire arrangement of displays and mounting arm can be positioned wherever it is most convenient.

Figure 19:
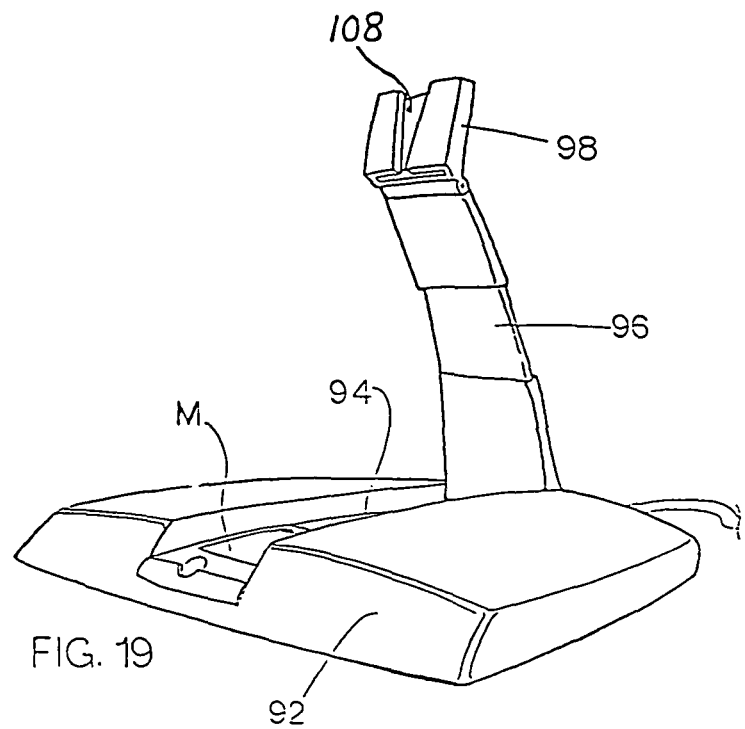
FIG. 19 is a perspective illustration of a stand somewhat similar to FIG. 18, with a collapsible stand arm nesting in a base.
Figure 19A:
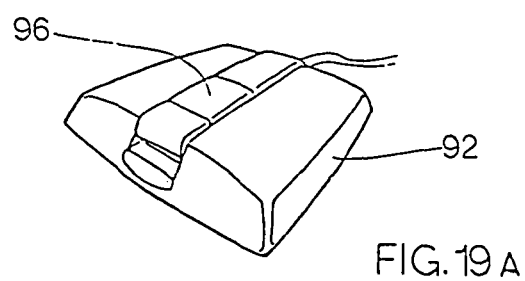
FIG. 19a is a perspective of the unit of FIG. 19 folded and nested for storage or carrying.

In this embodiment, for added security, locking screws 90 may be provided in either side of the V-shaped recess 82. The flexibility of the interchangeable screen system according to the invention is further illustrated in FIGS. 18 and 19. In this case, a portable mounting base for a single display screen may be provided. In this case a base 92 is formed with a groove 94. A swingable upright arm 96 is swingable into and out of the groove 94. The arm 26 may have a telescopic ability, and may be provided with a V-shaped retaining slot 98 at its upper end, for retaining a display screen shown in phantom as 12, having a mounting plug 84 formed to fit the slot 98. If desired the slot 94 may also be arranged to hold a manual computer "mouse" device of a type well known in computer art indicated generally as M, giving a limited degree of control over the display on the screen. FIG. 19a illustrates the device with the arm 94 swung downwardly into the groove 92 and nested.

Figure 20:
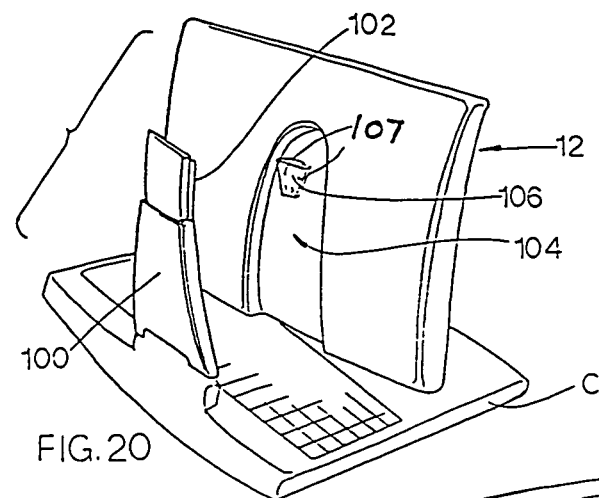
FIG. 20 is a rear perspective illustration partly exploded showing a modified form of computer together with a display releasable mounted on an arm extending from the computer.

FIG. 20 illustrates a modification of this concept, in which for example a computer of the lap-top type indicated generally as C may be provided with a swingable support arm 100, having a V-shaped slot 102 at its upper end similar to the slot 98. A display screen indicated generally as 12 may have a mating groove or recess 104 adapted to receive the arm 100, and within the groove 104 there is a V-shaped locking flange 106 shaped to mate with the V-shaped slot 102. The locking flange 106 can be provided with electrical contacts 107. Contacts 107 can be arranged to contact matching contacts 108 (FIG. 19), in the V shaped slot 102. This arrangement can be used in all these embodiments to avoid the use of cables wherever possible.

In this way the entire combination of lap-top computer and display 12 can be fitted together and swung down into a closed position for carrying or storage and can be swung upwardly for use, and if desired, the screen 12 as illustrated can be easily removed and a screen having different characteristics or a larger screen can simply be snapped in position, if desired.

Figure 21:
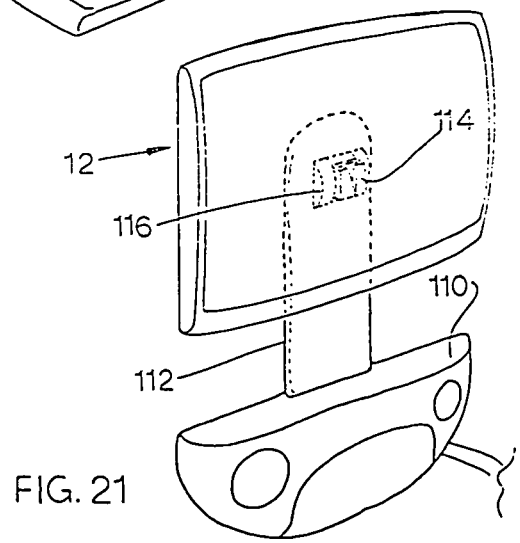
FIG. 21 is a front perspective illustration of a wall-mounted form of interchangeable display screen together with a control panel.

FIG. 21 illustrates the adaptability of the system for use in for example the removable mounting of a display screen on a wall, or the side of a booth for example. In this case a wall mounting block 110 can be attached by any suitable fastening means (not shown) for securing the same to a vertical surface. The mounting block 110 may have finger operated controls similar to a computer "Mouse" for limited control of the display on the screen for demonstration or presentation purposes and may have speakers for combined audio and visual effects.

The display screen 12 itself can again simply be mounted on an upright arm 112 having at its upper end a generally V-shaped recessed body 114, preferably on a hinged mount 116. The screen 12 will be supplied with a suitable V-shaped locking flange on its rear surface (not shown) of the type already described.

Figure 22:
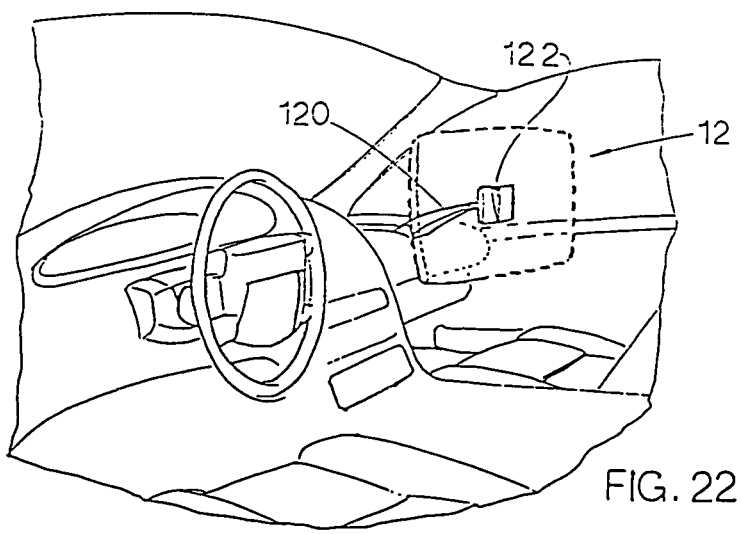
FIG. 22 is a schematic illustration showing an interchangeable mounting of a display screen in a vehicle.

FIG. 22 illustrates the same concept for the mounting of a display screen indicated as 12 in a vehicle. This may have application particularly for sales persons and for displaying maps of cities and the like, to assist drivers of delivery vehicles. In this case the display screen 12 can be mounted on an arm 120 secured at a suitable position on the front of the interior compartment of the vehicle. Again a releasable mount of the V-shaped slotted type shown as 122 is provided on the arm 120, and the screen 12 would be provided on its rear with a suitable inverted V-shaped locking flange fitting in the recess 122. There would also be provided matching electrical contacts, described above, in these components, to avoid the use of cables. In this way, the screen 12 could be placed and locked in position when it was required, and when the vehicle was parked the screen 122 could simply be easily dismounted and placed in the trunk, or taken out of the vehicle altogether, for greater security.

The screen 12 would be connected to a suitable small computer (not shown) again being of the portable type so that it could readily be removed from the vehicle.

Figure 23:
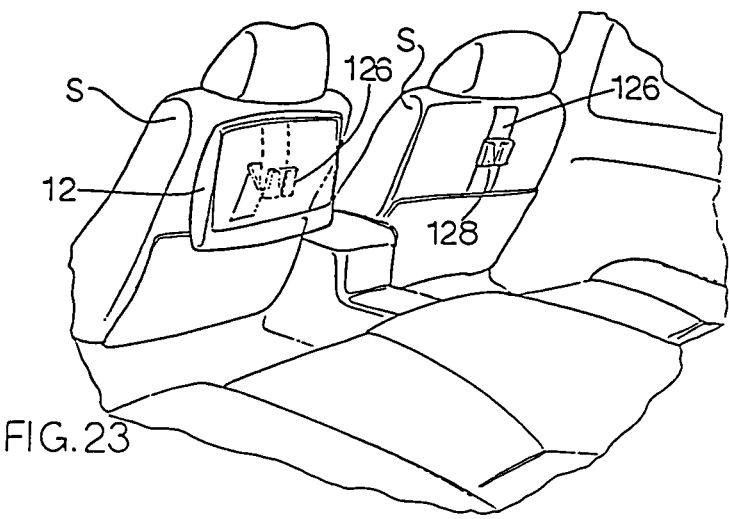
FIG. 23 is an illustration of another vehicle mounting of the interchangeable displays screen, in the rear compartment of the vehicle.

A somewhat similar arrangement could be made for the rear compartment of the vehicle illustrated in FIG. 23. In this case a swingable arm 126 is shown mounted in the rear surface of each of the front seats indicated as S in a vehicle.

A suitable V-shaped slotted mounting recess 128 would be mounted on the arm 126. The arm 126 could be swung out from the seat, and a display screen 12 could be mounted on the V-shaped recess.

Figure 24:
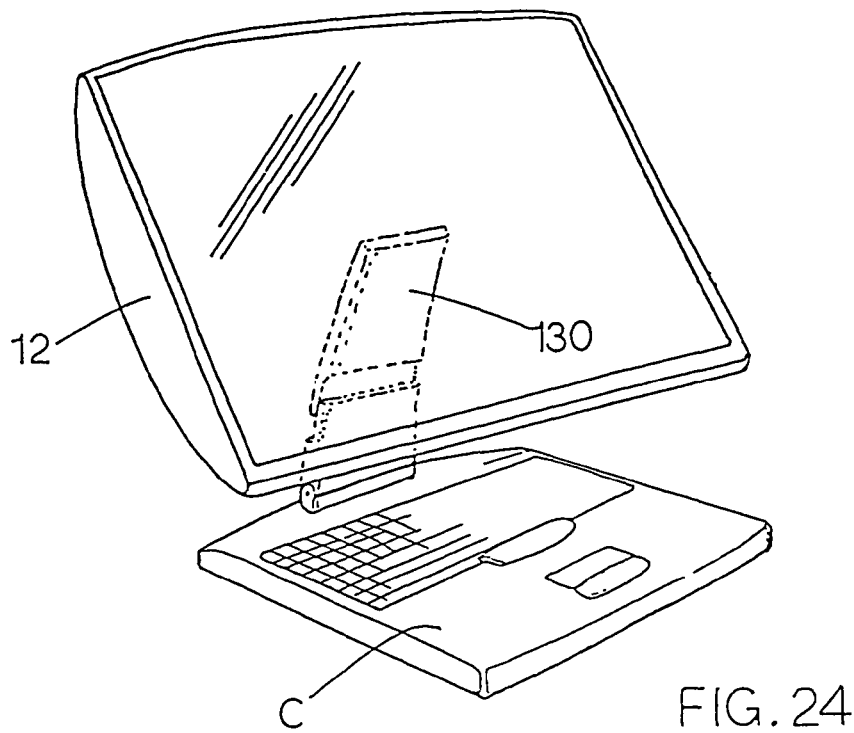
FIG. 24 is an illustration of a computer with a rear mounted support arm, and a greatly enlarged display screen fitted to the arm.

FIG. 24 illustrates a typical laptop computer C, having an enlarged display screen 12 mounted on a hinged arm 130, which is hinged to the rear of the computer. This illustrates the adaptability of the interchangeable screen mounting using the V-shaped recess and plug, so as to adapt a smaller laptop type computer C, with use with a much larger screen 12.

Figure 25:
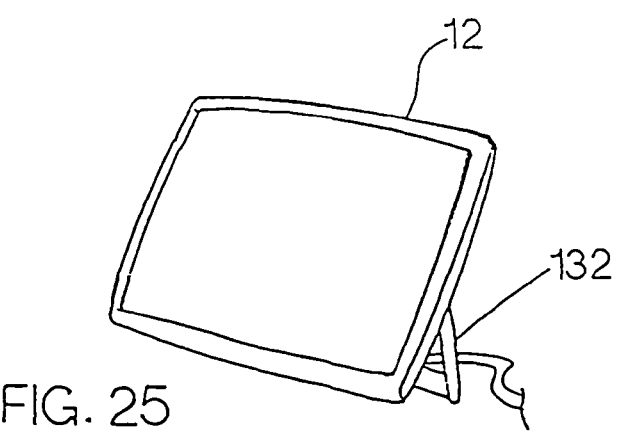
FIG. 25 is a perspective illustration of a table-mounted screen.

FIG. 25 illustrates the use of a free-standing screen 12 having a rearwardly mounted hinged leg 132, which can be swung rearwardly to support the screen at an angle somewhat in the manner of an easel. Again, the hinging leg 132 can be connected to the back of the screen 12 by interchangeable means such as the V-shaped recess and plug, if desired.

Figure 26:
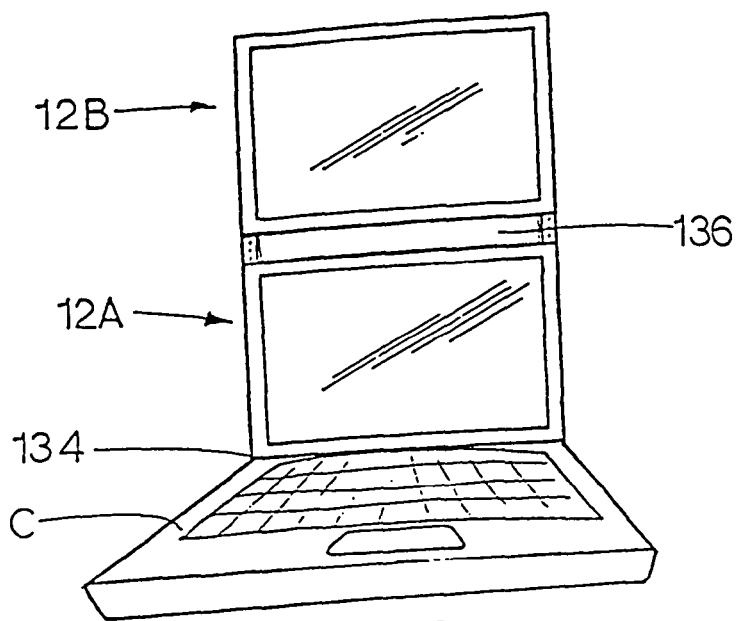
FIG. 26 shows a computer having two screens mounted one above the other, with a rotatable mount between the two screens.

FIG. 26 illustrates another configuration, in which a computer indicated generally as C may be provided with two screens 12A and 12B swingably and hingeably mounted to the rear edge of the computer C. The lower screen 12A is hinged along the line 134. The upper screen 12B is hinged to the lower screen 12A by means of the generally cylindrical tubular hinge bar 136.

Figure 27:
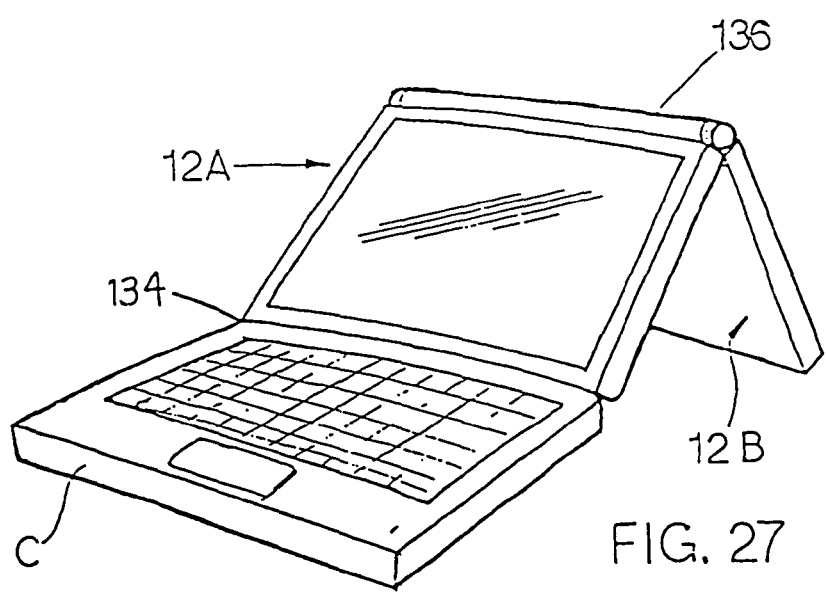
FIG. 27 is a view of the same computer as shown in FIG. 26 showing the two screens folded outwardly, so that the display can be viewed by two persons sitting opposite one another.

As illustrated in FIG. 27, the uppermost screen 12B can be swung into an obtuse angle relative to the lower screen 12A so that the two screens 12A and 12B can be viewed by at least two persons sitting opposite to one another. By means of suitable software, when the upper screen 12B is swung into the obtuse angle shown, the image on the screen 12B will be reversed, so that the images on screens 12A and 12B are both viewed the right way up.

Figure 29:
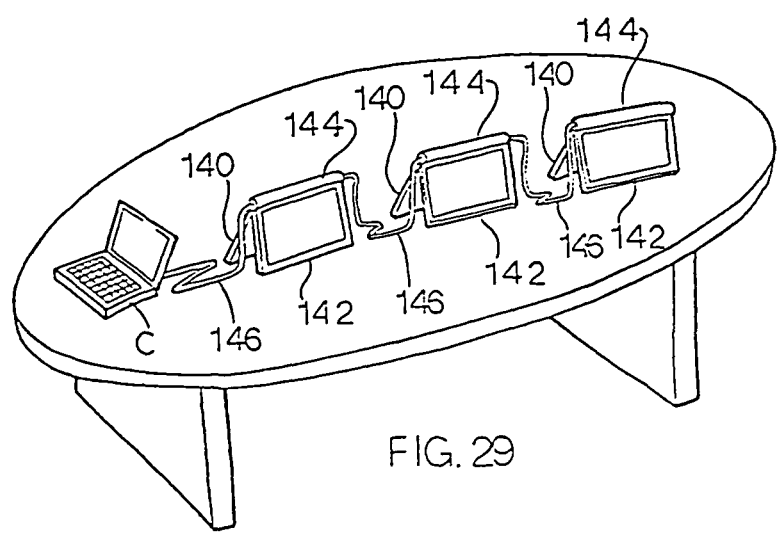
FIG. 29 is a perspective illustration showing a plurality of the display screens of FIG. 28 opened up so that they may stand on the table and face in opposite directions, and coupled to a computer.
Figure 28:
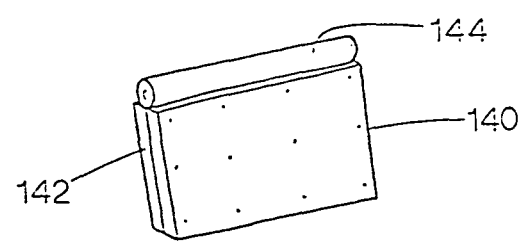
FIG. 28 is an illustration of a portable dual display screen with a hinging mount, the two screens being shown folded together in a stored or carrying position.

FIGS. 28 and 29 illustrate forms of free-standing dual screens indicated generally as 140 and 142, connected together by a tubular hinge bar 144.

The pairs of screens 140 and 142 can be swung open at obtuse angles to one another and stood on a surface such as a table as illustrated in FIG. 29. They may be connected to a computer C by means of daisy chain cables 146, which plug into opposite ends of the tubular hinge bar 144. As in the embodiment of FIGS. 26 and 27, the computer will contain suitable software the nature of which is to invert the image as between one screen and the other so that both screens show their respective images the right way up.

Various other modifications and adaptations can also be made using the principles of the invention.

Figure 30:
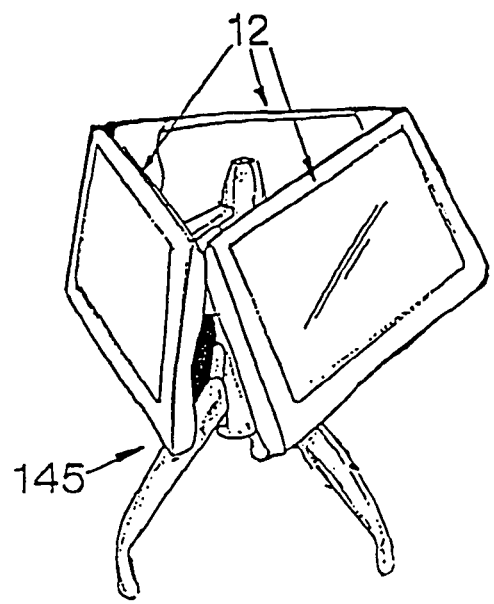

Thus, FIG. 30 is a perspective illustration of an alternate form of tripod display stand 145 for holding three displays 12 for example, on a conference room table or the like.

Figure 31:
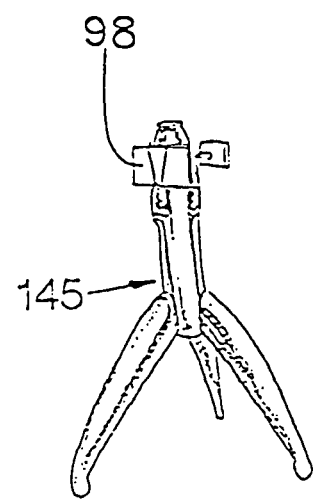
FIG. 31 is a perspective illustration of the tripod support of FIG. 30.

FIG. 31 is a perspective illustration of the tripod support 145 of FIG. 30.

Figure 32:
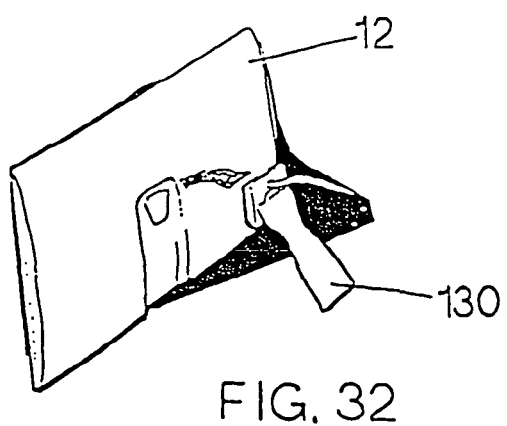
FIG. 32 is a rear perspective partially exploded view of another form of dismountable display leg for a display screen.

FIG. 32 is a rear perspective partially exploded view of another form of dismountable display leg 130 for a display screen 12.

Figure 33:
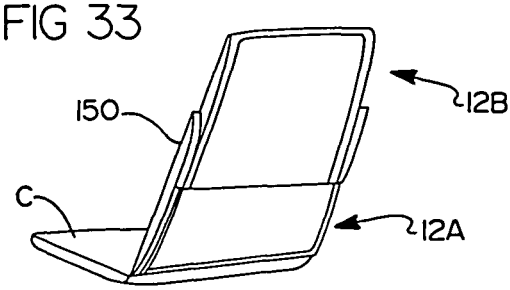
FIG. 33 is a rear perspective illustration of a typical lap top computer, having two display screens, the one being slidable relative to the other for nesting, or extendable for use.

FIG. 33 is a rear perspective illustration of a typical lap top computer C, having two display screens 12A and 12B, the one being slidable relative to the other for nesting, or extendable for use on arms 150.

Figure 34:
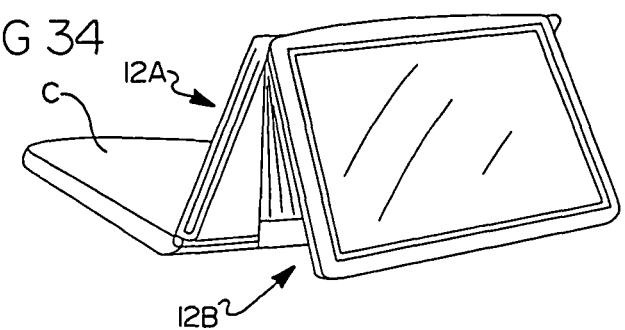
FIG. 34 is a perspective illustration of the lap top computer with dual display screens of FIG. 33 showing the display screens in another configuration.

FIG. 34 is a perspective illustration of the lap top computer C with dual display screens 12A and 12B of FIG. 33 showing the display screens in another configuration.

Figure 35:
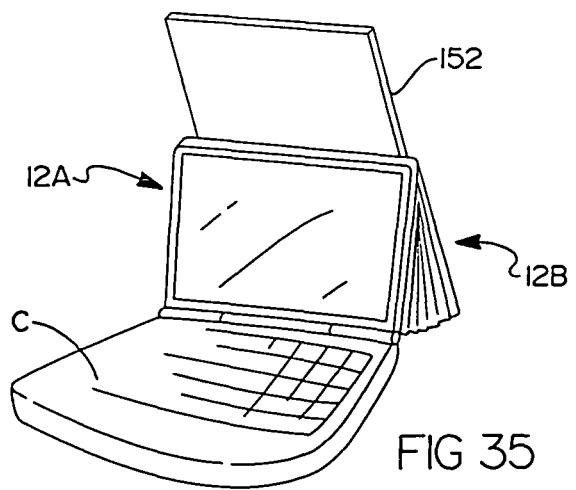
FIG. 35 is a perspective illustration of another form of lap top computer having two display screens, and showing a slidable cover panel for one of the two display screens.
Figure 44:
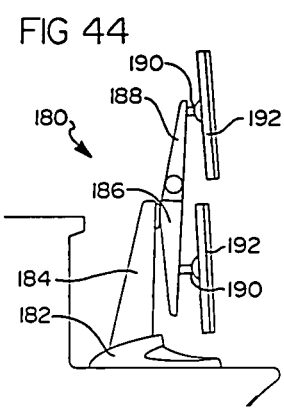
FIG. 44 is a side elevational view of a display system of the present invention incorporating a telescoping and pivoting upper support arm for positioning an upper LCD panel adjustably at a desired height above a lower LCD panel or in an orientation facing away from the lower LCD panel.

FIG. 35 is a perspective illustration of another form of lap top computer C having two display screens 12A and 12B, and showing a slidable cover panel 152 for one of the two display screens.

FIG. 36 is a rear perspective view of another form of display screen 154, showing attachment recesses 156 for various components. Electrical connections 157 are incorporated in the recesses 156 for interconnection with matching contacts (not shown) in suitable accessories. Accessories may include audio speakers, and video cameras for direct feed back, to give only two examples.

FIG. 37 is a perspective illustration of, for example, a lap top computer C showing two display screens 154-154 such as that illustrated in FIG. 36, being attachable to a hinge mounting 158 on the computer.

FIG. 38 is a front elevational view of a pair of display screens 154-154 as illustrated in FIG. 36 shown side by side with audio speakers 158 and video cameras 159 attached.

FIG. 39 is a front elevational view corresponding to FIG. 38, but showing the two display screens 154-154 one above the other, As best shown in FIGS. 40, 41 and 42, a further embodiment of the invention may provide for a typical computer C having two display screens 160 and 162. The screen 160 is hinged to the computer by means of a hinge 164. The second screen 162 is hinged to the first screen by means of a vertical hinge along one side indicated as 166.

As best shown in FIGS. 41 and 42, the two screens 160 and 162 may either be swung out so that they are side by side with one another facing the operator of the computer C, or, as shown in FIG. 42, the two screens may be swung so that screen 162 is back to back with screen 160, thereby displaying the display both to the operator of the computer and to somebody sitting facing him. In this form of the invention special software and the like will not be required for the reversing of the images, since both images will be shown the right way up.

Referring briefly now to FIG. 43, a computer 168 in accordance with another alternative preferred embodiment of the present invention is shown. The computer incorporates a center LCD panel 170 pivotably mounted by a hinge 172 to a base portion 174 of the computer. Pivotably supported on opposite sides of the center LCD panel 170 are a pair of LCD panels 176 which are each about one-half the width of the center LCD panel 170. The outer LCD panels 176 are supported by hinges 178, which may be identical in construction to hinge 172. The outer LCD panels 176 may be folded over the center LCD panel 170 and the entire display portion comprising panels 170 and 176 then folded down against the base 174 to form a compact unit that may be easily carried.

In FIG. 43A, a multimedia laptop computer 168' is shown. The computer 168' incorporates a pair of speakers 175 which are hingedly coupled via hinges 178' to a lower LCD panel 170'. The lower LCD panel 170' is itself hingedly coupled to a keyboard portion 174' via a hinge 172'. An upper LCD panel 179 is also hingedly coupled via a hinge 177 to the lower LCD panel 170'. When folded, the computer 168' forms a compact, lightweight system.

Referring now to FIGS. 44-49, a display system 180 in accordance with another alternative preferred embodiment of the present invention is shown. The display system 180 includes a base 182 and a support column 184. Secured to the support column 184 is a lower support arm 186 and a telescoping upper support arm 188. Attached to each support arm is a mounting assembly 190, which preferably comprises a ball joint such as that described herein. Secured to each mounting assembly 190 is a LCD panel 192.

Figure 45:
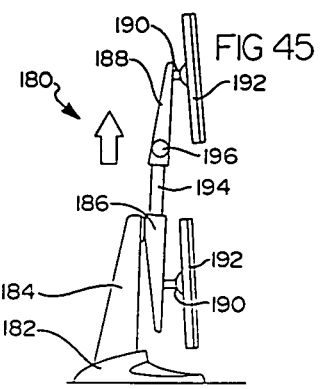
FIG. 45 is a side elevational view of the display system of FIG. 44 showing the upper support arm in an extended position.
Figure 46:
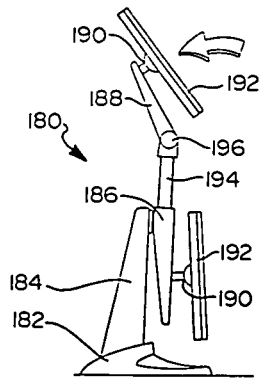
FIG. 46 is a side elevational view of the display system with the upper LCD panel adjusted at an angle relative to the lower LCD panel.
Figure 47:
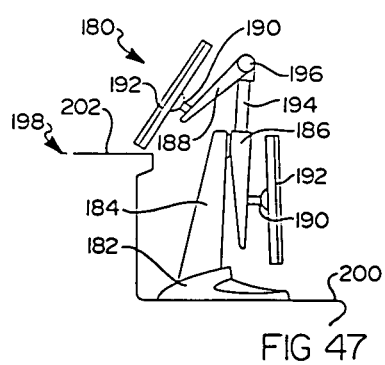
FIG. 47 is a side elevational view of the display system with the upper LCD panel folded over backward relative to the lower LCD panel.

With specific reference to FIGS. 45-47, the lower support arm 186 comprises a tubular construction and the upper support arm 188 comprises a neck portion 194 which enables the upper support arm 188 to be extended (i.e., telescoped) relative to the lower support arm 186. The upper support arm 188 further includes a hinge 196 which enables the upper LCD panel 192 to be angled relative to the neck portion 194 so as to place it at a convenient viewing angle. As is apparent in FIG. 47, the upper LCD panel 192 can even be rotated into position to face away from the lower LCD panel 192. This orientation is particularly well suited for retail applications where a sales person needs to view information while inputting product or other information, and where it is desirable to display to the customer various items of information as the transaction is conducted. Advantageously, the telescoping upper support arm 188 and the hinge 196 enable the two LCD panels 192 to be placed at separate heights to accommodate airline ticket counters, hotel registration counters and other like structures where an employee's counter is frequently at a different height from a surface or counter useable by a customer.

Figure 48:
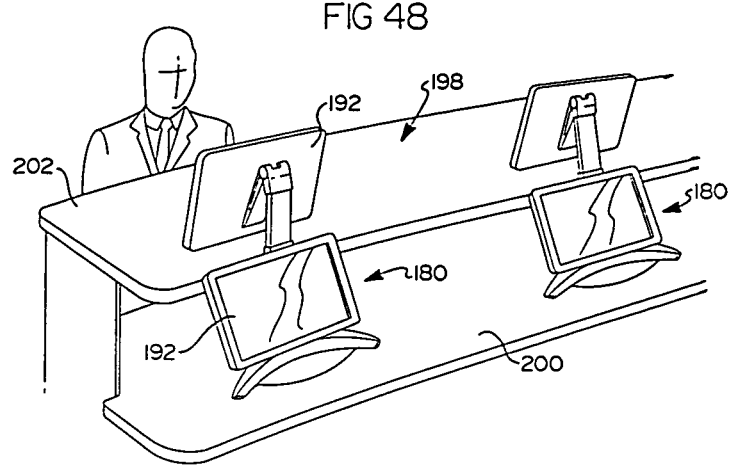
FIG. 48 is a perspective view of the display system in use at an airline ticket counter.

FIGS. 47 and 48 illustrate the display system 180 in use at an airline ticket counter 198 having a first counter 200 at a lower height than a second counter 202. In this application it will be appreciated that suitable software will be required to "flip" the image displayed on the upper LCD panel 192. The telescoping upper support arm 188 inherently provides a degree of adjustability to accommodate a range of counter heights without modification to the either of the support arms 186,188 or the support column 184.

Figure 49:
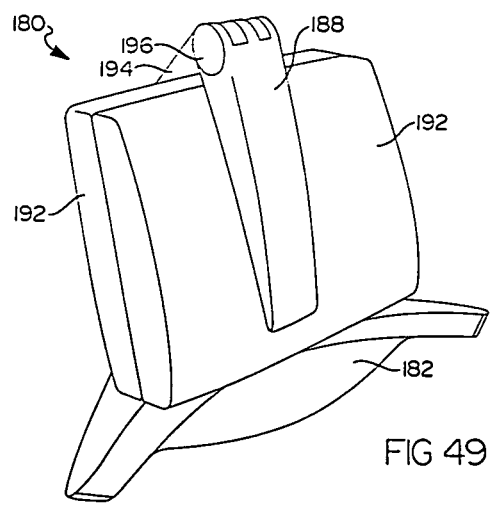
FIG. 49 is a perspective view of the display system in a folded orientation for easy handling.

FIG. 49 illustrates the two LCD panels 192 folded together such that the display system 180 forms a compact assembly which may be easily transported if needed. In this regard it will be appreciated that any form of conventional clasp may be included to secure the folded LCD panels 192 to one another or to the base. Also, a handle could easily be attached to a portion of the display system 180, such as the support column 184, to enable the system 180 to be easily transported.

Figure 50:
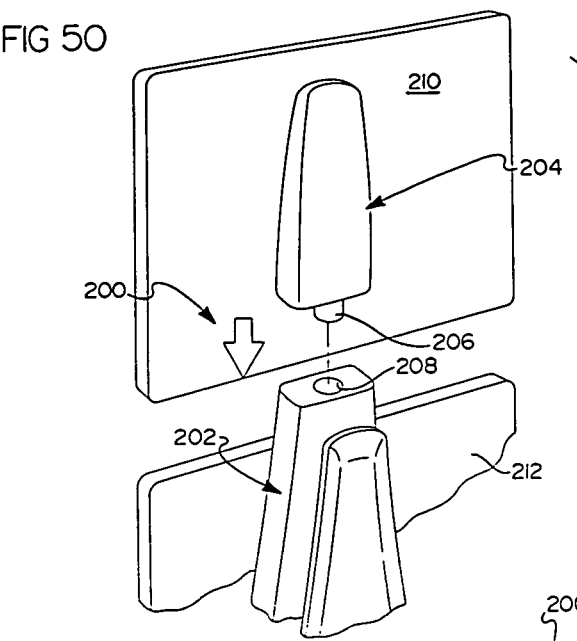
FIG. 50 is a perspective view of an alternative preferred embodiment of a display system of the present invention incorporating a rotating support member to enable a LCD panel to be rotated about a vertical axis.
Figure 51:
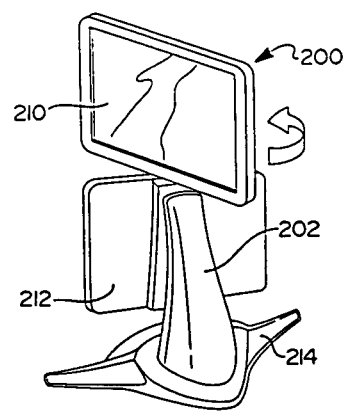
FIG. 51 is a perspective view illustrating an upper LCD panel mounted for swiveling movement relative to a lower LCD panel using the system shown in FIG. 50.

Referring now to FIGS. 50 and 51, still another display system 200 is shown. With specific reference to FIG. 50, the display system 200 includes a support column 202 and an upper support member 204 having a neck portion 206. The support column 202 includes a bore 208 adapted to receive the neck portion and enable the neck portion 206 to rotate or swivel therein such that the upper support member 204 can be swiveled. The support member 204 is secured to a rear surface 212 of a LCD panel 210 through either a fixed arrangement or a pivotable mounting arrangement such as disclosed herein. The neck 206 may be captured by any suitable arrangement in the bore 208 such that the LCD panel 210 is not removable from the support column 202. Alternatively, it may be releasably disposed in the bore 208 such that the entire upper support member 204 and LCD panel 210 may be lifted out of the column 202 before repositioning the LCD panel 210 as desired. In this manner the clearance between the LCD panel 210 and the support column 202, which would otherwise be important for allowing the support member 204 to freely rotate with the LCD panel 210 thereon, will not be a concern.

Figure 52:
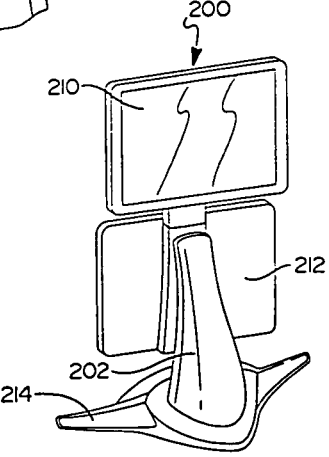
FIG. 52 is a perspective view of the display system shown in FIG. 51 showing the two LCD panels facing in opposite directions.

With specific reference to FIG. 51, the display system 200 is shown with the upper LCD panel 210 rotated to a position perpendicular to a lower LCD panel 212. The support column 202 is supported on a base 214. In FIG. 52 the upper LCD panel 210 is rotated 180 degrees from the lower LCD panel 212 to permit two individuals facing each other to each view one of the LCD panels 210, 212.

Figure 53:
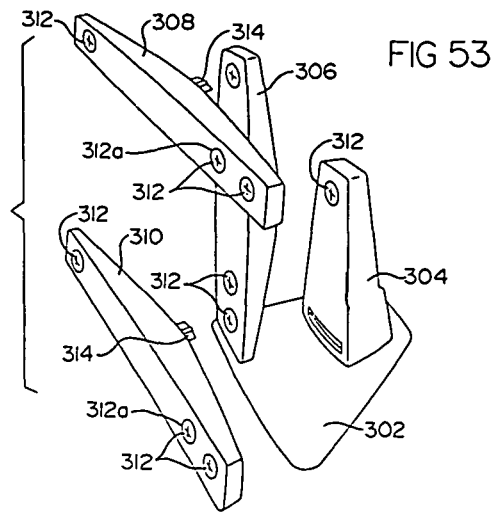
FIG. 53 is an exploded perspective view of a modular, multi-panel LCD display system in accordance with another alternative preferred embodiment of the present invention.

Referring now to FIG. 53, a modular display system 300 is shown in accordance with another alternative preferred embodiment of the present invention. The display system 300 is intended to support anywhere from one to four independent LCD display panels, but it will be appreciated that the system 300 could easily be expanded to support more than four LCD panels if needed, as will be explained momentarily.

Referring to FIG. 53, the system 300 includes a base 302, a support column 304, a first support arm 306, a second support arm 308 and a third support arm 310. Each support arm 306, 308 and 310 includes at least two coupling assemblies 312, and preferably three such assemblies 312. The support column 304 also includes once such assembly 312, although this member could also include several assemblies 312 if needed. Support arms 306, 308 and 310 each also include a mounting member 314 (with the mounting member of support arm 306 being hidden in FIG. 53) which is disposed preferably at an approximate mid-point along a length of its support arm. Each mounting member 314 is adapted to engage in either one of two positions 90 degrees offset from one another in one of the coupling assemblies 312 in a key-like fashion to hold its associated LCD panel in either a portrait orientation or a landscape orientation.

Figure 55:
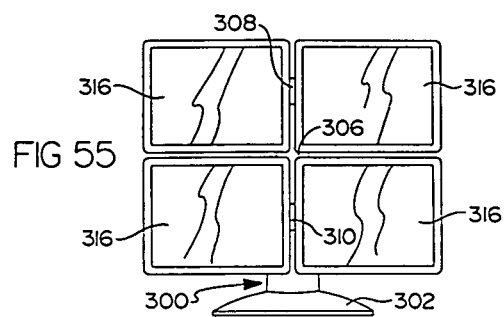
FIG. 55 is a front view of the display system of FIG. 54 with four LCD panels attached thereto.
Figure 56:
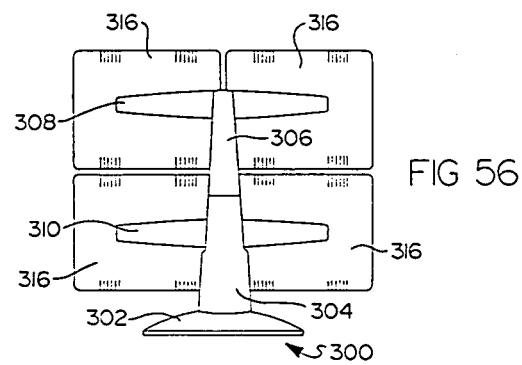
FIG. 56 is a rear view of the display system of FIG. 55.
Figure 57:
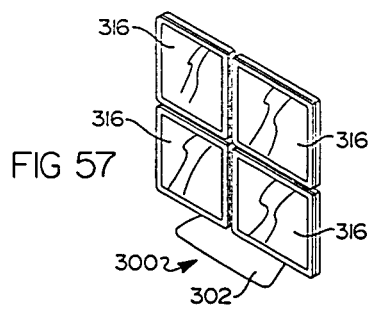
FIG. 57 is a perspective view of the display system of FIG. 55.

The pair of coupling assemblies closely adjacent each other on each support arms 308 and 310 are provided to space two adjacently positioned LCD panels mounted on each arm slightly farther apart from each other to provide additional clearance needed when the two LCD panels are placed in a landscape orientation. Thus, in a landscape orientation, the two LCD panels supported on either of the arms 308 and/or 310 will be supported at the two outermost coupling assemblies 312 near the very ends of each arm. In a portrait orientation the LCD panels will need to be spaced closer to each other, thus requiring one of the LCD panels to be coupled to the more inwardly positioned assembly 312a (FIG. 53) of each support arm 308 and 310. The closely positioned pair of coupling assemblies 312 on support arm 306 enables the third support arm 310 to be mounted in one of two positions on arm 306 depending upon whether the LCD panels are disposed in a landscape or a portrait orientation. FIGS. 55-57 illustrate four LCD panels 316 supported on the display system 300. It will be appreciated that each of the LCD panels 316 includes a mounting member identical or similar to members 314 on a rear housing surface thereof such that each can be quickly and easily coupled to one of the coupling assemblies 312.

Figure 54:
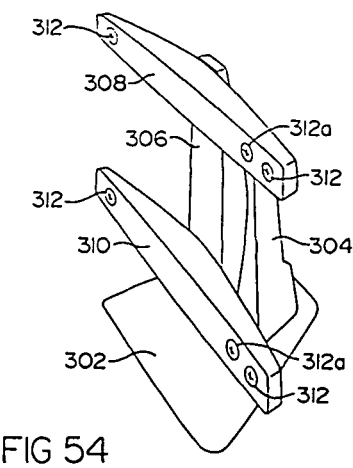
FIG. 54 is a perspective view of the display system shown in FIG. 53 in assembled form ready to accept four LCD panels.
Figure 58:
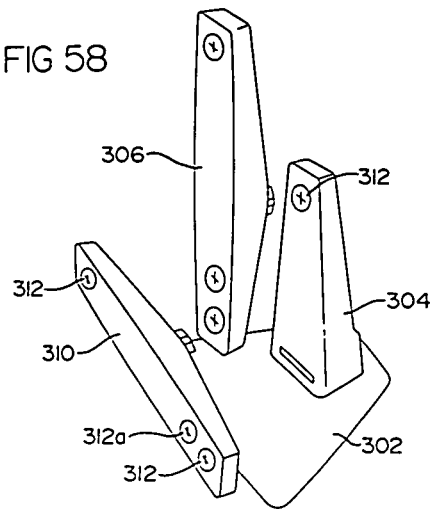
FIG. 58 is an exploded perspective view of the system shown in FIG. 53 but without one of the support arms such that a three LCD panel display system is formed.
Figure 59:
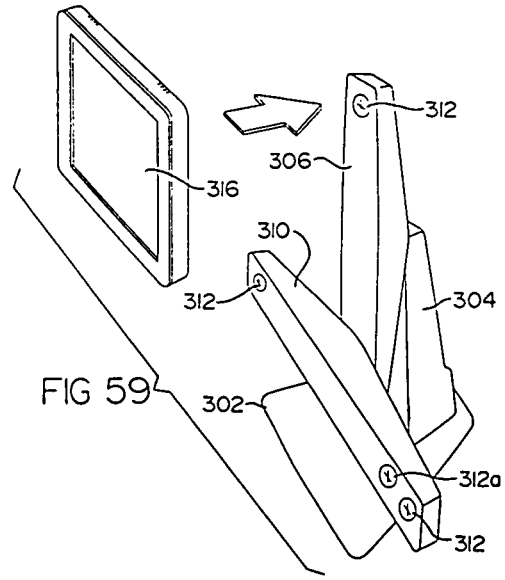
FIG. 59 is an exploded perspective view of the display system shown in FIG. 58 illustrating how a single LCD panel is attached at an uppermost end of one of the support arms.

It will be appreciated that the display system 300 could easily be used to support less than four LCD panels 316 if desired. For example, in the drawing of FIG. 54 the second support arm 308 could be eliminated and the one LCD panel 316 coupled directly to the vertically uppermost coupling assembly 312. This arrangement is illustrated in FIGS. 58-60. Alternatively, the lower support arm 310 could be eliminated and a LCD panel 316 coupled directly thereto as illustrated in FIGS. 61 and 62.

It will be appreciated that the display system 300 could be easily modified through the use of additional support arms to support more than four LCD panels 316 if needed. For example, the support arm 306 could be lengthened sufficiently to extend above the second arm 308, and a fourth support arm identical to arms 308 and 310 could be coupled perpendicularly thereto such that two extra LCD panels could be supported. An even longer support member and still another extra support arm could be incorporated to support eight LCD panels 316. As can be appreciated, a very large plurality of independent LCD panels can be supported from a single base 302 and support column 304 if needed. Particularly desirable is the feature of being able to orientate the LCD panels 316 in either portrait or landscape mode, or a combination of each, as needed. FIGS. 63 and 64 illustrate variations of the above described display systems incorporating both landscape and portrait orientated LCD panels 316.

Referring now to FIGS. 65-70, a display system 400 in accordance with another preferred alternative embodiment of the present invention is illustrated. Display system 400 incorporates a base assembly 402, a vertical support member 404, and a pair of telescopically mounted support arms 406 supported by a central arm 408 which is secured to the vertical support member 404 either fixedly (i.e., non-movably) or for rotational movement relative to the vertical support member 404. Each support arm 406 includes a mounting member 410 for supporting an LCD screen on the arm, as hereinbefore described. The support member 408 may be tubular, in the form or a C-channel or the form of a U-channel, and telescopically supports each arm 406 for sliding movement into or outwardly of the support member 408. Since the two support arms 406 are independent members, each can be extended or retracted without the need for moving the other support arm 406.

Figure 68:
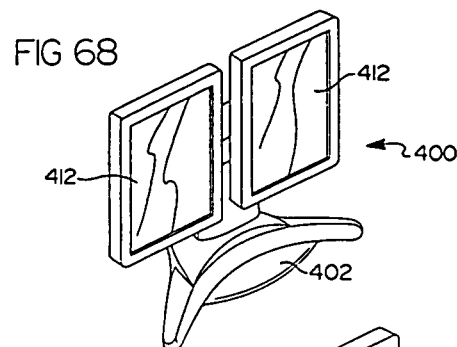
FIGS. 68-70 illustrate the display support system of FIGS. 65-67 supporting a pair of LCD screens in various orientations.
Figure 69:
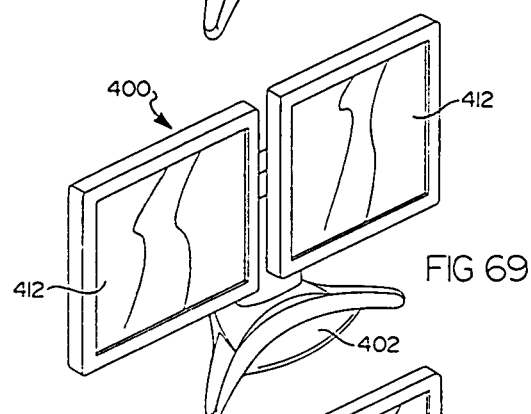

With specific reference to FIGS. 65 and 68, the system 400 is shown supporting a pair of LCD screens 412 attached to the mounting members 410 both in a portrait orientation. In this illustration, the LCD screens 412 comprise 10 inch screens. The independent adjustability of each support arm 406 enables each LCD panel 412 to be extended to the position needed to place the two LCD screens 412 closely adjacent each other.

Figure 70:
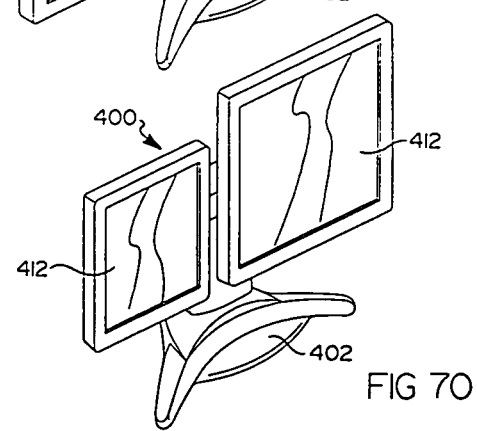

Referring to FIGS. 67 and 70, the display system 400 is shown supporting one of the LCD display screens 412, which in this example is a 10 inch screen, in a portrait orientation, and the other screen 412, which in this example is a 15 inch screen, in the landscape orientation. The independent movement of each support arm 406 allows each to be adjusted to the proper length of extension to permit the LCD screens 412 to be positioned side-by-side in this orientation, and also such that they are abutting or virtually abutting each other so that there is no objectionable gap between them. The display system 400 thus enables monitors of varying sizes to be mixed as needed and positioned to most efficiently enable the user to view information on the screens 412.

Referring now to FIGS. 71-75, a display system 500 is illustrated in accordance with another alternative preferred embodiment. The system 500 is identical to the system 400 of FIGS. 65-67 with the exceptions of locking mechanisms on each of the support arms and a centering device for centering two LCD screens on the display system 500.

Referring specifically to FIG. 71, the display system 500 includes a base 502, a vertical support member 504 fixedly secured to the base 502, and a pair of support arms 506 each disposed for telescopic movement relative to a center support arm 508. The center support arm 508 also includes two locking mechanisms 510 which can be used to lock each support arm 506 at a desired position such that the locked arms 506 cannot move. A centering member 512 is pivotably disposed on the support arm 508.

The locking mechanisms 510 may comprise buttons which are biased toward their respective support arm 506 such that they automatically engage with preformed openings in their respective support arm 506, and need to be depressed to release their associated support arms before each can be extended or retracted from the support member 508. FIG. 72 illustrates the support arms 506 in their fully retracted positions.

Referring to FIGS. 72-76, the centering member 512 will be described in further detail. The centering member 512 comprises an independent member which is pivotably secured by a pair of pivot pins 514, shown in FIG. 75, which are disposed in openings formed in the support member 508. When in the retracted or closed position shown in FIG. 72, the centering member 514 sits flush with an outer surface of the support member 508. When extended, the centering member 514 projects outwardly of the support member 508 to form a means by which the LCD screens supported on the arms 506 can be precisely centered on the arm 508. In the retracted position, the centering member 514 rests within a recess or opening 516 formed in the arm 508. FIG. 74 shows the centering member 512 extended to enable centering of a pair of LCD screens 518 mounted thereon via mounting members 520. FIG. 76 illustrates a pair of LCD screens 518 of different sizes to further illustrate the easy centering thereof by use of the centering member 512.

Figure 77:
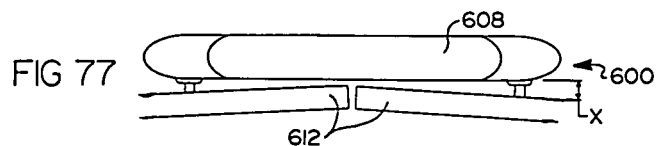
FIG. 77 is a partial plan view of the display screen support system shown in FIG. 71 illustrating the limited degree of booking available because of limited clearance between the edges of the LCD screens and the support arm of the system.
Figure 78:
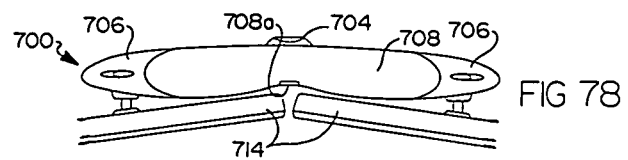
FIG. 78 is a partial plan view of an alternative preferred embodiment of a display screen support system which allows for an increased degree of booking of two LCD screens by virtue of a concavity formed in a support arm portion thereof.

Referring now to FIG. 78, a means of providing enough clearance around the support arm of a display system to permit increased booking of a pair of LCD screens is shown. In FIG. 77, a display system 600 substantially identical to the display system 400 of FIGS. 65-67 is shown, illustrating that this system enables a slight degree of booking which, in some situations may not be as much as a user would desire. In this example each LCD screen 612 can only be "booked" inwardly toward each other a slight degree due to the presence of the support arm 608. The display system 700 shown in FIG. 78 overcomes this problem. The display system 700 includes a vertical support member 704 which supports a support member 708. The support member 708 telescopically supports a pair of independent support arms 706. However, the support member 708 is formed with a concavity or "bend" 708a at the longitudinal midpoint thereof. The centering component 714 is preferably disposed at this midpoint 708a and may include an arcuate shape to conform and blend in with the outer surface of the support member 708 at this point on the member 708. Thus, an increased degree of booking is enabled without the requirement of any additional component parts.

Figure 79:
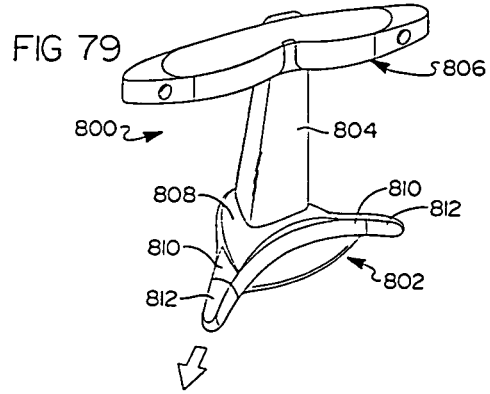
FIGS. 79 and 80 are perspective views of the display support system of FIG. 78 but with a base assembly incorporating extendable foot portions to increase the effective footprint of the base assembly.
Figure 80:
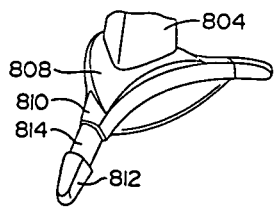
Figure 81:
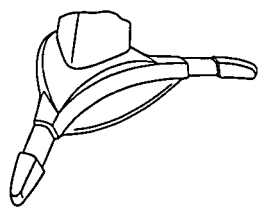
FIG. 81 is a perspective view of the base assembly of FIGS. 79 and 80 but with an increased base panel portion to provide even further stability to the base assembly.

Referring to FIGS. 79-81, a display system 800 in accordance with another alternative preferred embodiment of the present invention is shown. The display system 800 includes a modified base assembly which can be adjusted to provide a larger "effective" footprint to thereby support larger LCD screens with even greater stability.

The display system 800 includes a base 802, a vertical support member 804, and an arm assembly 806 which, in this embodiment, is identical to the arm construction of the embodiment 700 shown in FIG. 78 and the description above relating thereto. It will be appreciated immediately, however, that the base assembly 802 could be used with virtually any form of arm, and is therefore not limited to the support arm 806 shown in FIG. 79.

The base assembly 802 includes a platform 808 which includes at least a pair of integrally formed channels 810. Each channel telescopically supports an independent support foot 812. Each support foot 812 includes a neck portion 814, illustrated in FIG. 80, which resides completely within its associated channel 810 when the foot is in a retracted position, as illustrated in FIG. 79.

When one or more LCD screens are being supported on the arm assembly 806 which, because or their size or weight, require a larger support "footprint" to ensure stability thereof, the foot portions 810 can be quickly and easily extended by simply pulling outwardly on each. This provides a larger effective footprint for the base 802 and therefore even greater stability. When the larger footprint is not required, the foot portions 810 can simply be pushed into the channels 810 to shrink the footprint such that the base 802 takes up less space on a desk, credenza, etc. Advantageously, no tools are required to enlarge the footprint of the base 802 and any LCD screens mounted on the display system 800 do not need to be removed before extending the foot portions 812.

Referring now to FIG. 81, a modified base 802a is shown which includes an even larger platform 808 made up by a larger front base portion 803 is shown. Base 802a enables an even further degree of stability to be achieved over the embodiment of the base 802 shown in FIG. 79.

Referring now to FIGS. 82-86, various embodiments are disclosed for enabling smooth, sliding movement of the support arms described in connection with FIGS. 65, 71 and 78. In FIG. 82, a support arm 900 and a support member 910 are illustrated. The support arm 900 has a neck portion 902 and an end portion 901. The end portion 901 includes an LCD screen mount 901 such as described hereinbefore.

The neck portion 902 includes a pair of rollers 904 mounted for free rolling movement and such that they extend just slightly beyond the outer upper surface 902a of the neck portion 902. Optionally, the neck portion 902 can include a channel 906 formed in one or a pair of opposing side wall portions 908 of the neck portion 902. A center support member 910 is formed of a tubular construction and includes a projecting lip portion 912a extending from a lower wall 912. Disposed in the lower wall 912 are a pair of rollers 914 mounted for rotation in cut-outs 916. The interior area of the support member 910 accepts the neck portion 902 of support arm 900 and the rollers 914 and 904 cooperate to enable a smooth, low resistance rolling movement of the neck portion 902 relative to the support member 910.

FIG. 83 illustrates an alternative preferred embodiment of the support member 910' having a plurality rollers 914' disposed within the support member 910'. In this embodiment no rollers 904 would need to be provided on the neck portion 902 of the support arm shown in FIG. 82 to enable smooth sliding movement.

FIG. 84 shows a support arm 920 in accordance with another alternative preferred embodiment of the member 910. Support member 920 includes an LCD mounting member 922, such as described hereinbefore, and a neck portion 924 having a pair of longitudinally extending channels 926 facing away from each other. A support member 928 is of tubular construction and includes a pair of opposite, inwardly facing ribs 930 which ride within the channels 926 to help guide the neck portion for sliding movement. FIG. 85 illustrates an embodiment 920' which is identical to the embodiment shown in FIG. 84 except for the use of square shaped channels 926' and square shaped ribs 930'.

Referring now to FIGS. 86-88, a locking system for enabling quick and easy movement of a ball joint type mount from a portrait orientation to a landscape orientation is shown. A neck 952 of a ball joint type LCD screen support 950 has a keyed end 954. The end 954 resides within an opening 956 in a support arm 958. The keyed end 954 has a keyed opening 960 which is able to receive a similarly keyed member 964 of a release assembly 962.

The release assembly 962 includes a flip up handle 966 attached to a shaft 968. The shaft 968 is also attached to the keyed member 964 and moves slidably within a washer 970 separated from the handle by one or more springs 972.

Figure 89:
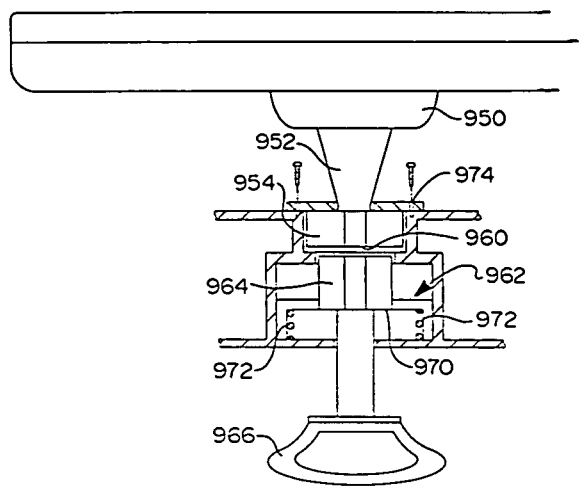
FIG. 89 is a partial cross sectional view in accordance with section line 89-89 in FIG. 88.

The end 954 is captured in the opening 956 by a retainer plate 974 which is fixedly secured to the support arm 958, as also shown in FIGS. 87 and 88. The washer 970 is also secured to the support member 958 such that pulling on the handle 966 allows the keyed member 964 to be released from the keyed opening 960, when assembled into the arm 958, thereby permitting the keyed end 954 to be rotated while the handle 966 is pulled. In this manner the orientation of the ball joint type LCD screen support 950 can be changed between two orientations. FIG. 89 illustrates a partial cross section of the release assembly 962 disengaged from the keyed end portion 954.

Figure 90:
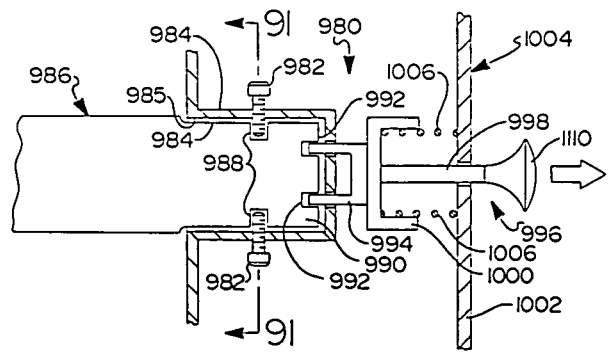
FIG. 90 is a partial cross sectional view of an alternative preferred embodiment of the display system shown in FIG. 89, which incorporates stop members for limiting movement of an LCD mount member between two positions 90 degrees apart from one another.

Referring now to FIG. 90, another release mechanism 980 in accordance with another alternative embodiment of the present invention is shown. This embodiment is very similar to the embodiment of FIGS. 86-89 with the exception that automatic stops are built in to the mechanism to allow movement only between two positions 90 degrees apart from one another.

Figure 91:
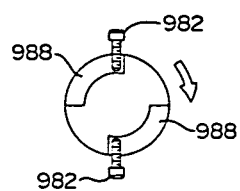
FIG. 91 is a simplified cross sectional view of the neck portion of an LCD support member in accordance with section line 91-91 in FIG. 90 illustrating the two grooves which limit movement of the neck portion.
Figure 92:
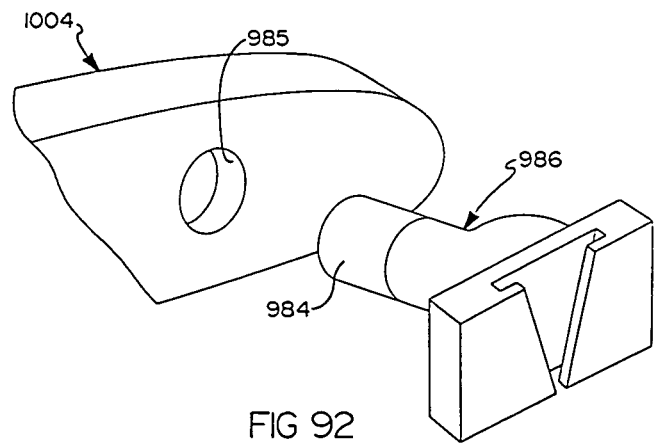
FIG. 92 is a perspective view of the LCD screen mounting member and a portion of the support member, illustrating the recess in the support member.

With further reference to FIG. 90, two stop members 982 are fixedly disposed within a portion of a support arm 984 having a recess 985. A neck portion 984 of a LCD screen mount 986 includes a pair of oppositely facing grooves formed in the neck 984 which receive the stop members 982. As can be seen in FIG. 91, the grooves 988 only allow the neck 984 to rotate between two positions ninety degrees apart. The LCD screen mount 986 is also shown in FIG. 92.

Referring further to FIG. 90, an outermost end of the neck 990 includes a pair of keyed grooves 992. A key portion 994 of a release member 996 is fixedly secured to a shaft 998. A stop element 1000 is separated from a wall portion 1002 of a support arm 1004 by a pair of springs 1006. The shaft 998 extends through a hole 1008 in the wall portion 1002 and has a graspable knob 1110 at the end thereof. Pulling outwardly on the knob 1110 against the biasing force of the springs 1006 causes the stop element 1000 to be withdrawn from the keyed grooves 992, thus enabling the neck 984 to be turned between one of two positions 90 degrees apart from one another while the knob 1110 is held in its pulled out position. When the knob 1110 is released, the springs 1000 bias the key portion 994 back into the grooves 992 such that the neck 984 cannot be rotated. In this regard it will be appreciated that the grooves may also form a plurality of apertures that enable the neck 984 to be rotated between two positions about 90 degrees apart.

Referring now to FIGS. 93-103, a display system 1120 is shown. The display system 1120 incorporates a universal ball hinge mechanism 1122 for coupling two LCD screens 1124 together and allowing rotation relative to one another about two axes extending perpendicular to each other. Release mechanisms 1126 enable the two screens to be secured in either portrait or landscape orientations. In this manner the screens can be used in a variety of orientations to fit the needs of specific applications or situations where multiple screens of information need to be displayed in certain orientations.

Figure 104:
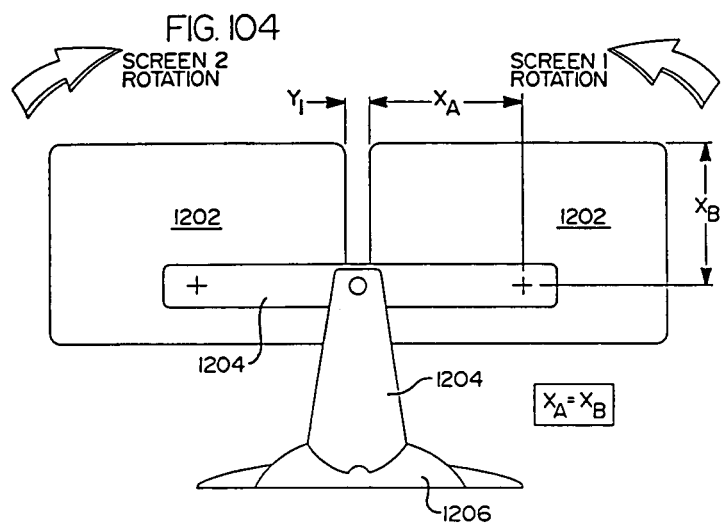
FIGS. 104 and 105 are elevational views of an arrangement for positioning two LCD screens on a common support arm such that the screens can be repositioned in either portrait or landscape orientations without requiring same to be spaced at different distances from one another.

Referring now to FIG. 104, a display system is 1200 is illustrated in which a pair of LCD screens 1202 are supported on a common display arm 1204, which is in turn supported on a vertical support 1206. The vertical support 1206 is supported fixedly on a base unit 1208. With this embodiment, the LCD screens 1202 do not need to be moved closer to or farther from each other when remounted in a landscape or a portrait orientation.

Figure 105:
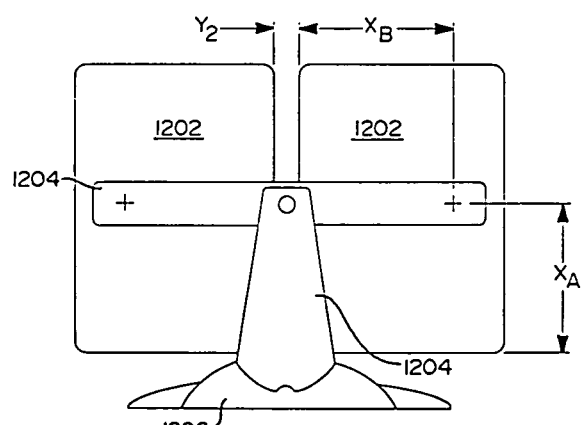

In FIG. 104, the dimension $X_A$ is set equal to the dimension $X_B$. Thus, when the LCD screens are repositioned on the support arm 1204 in FIG. 105, there is sufficient clearance to permit mounting the screens in the portrait orientation.

Referring now to FIGS. 106-118, a release member 1200 in accordance with an alternative preferred embodiment of the present invention is illustrated. This embodiment incorporates a shaft 1202, as illustrated in FIGS. 106-108, having a plurality of teeth 1204a, 1204b and 1204c. Teeth 1204a and 1204c are each spaced 90 degrees away from the central tooth 1204b. As shown in FIG. 107, each tooth 1204 preferably includes a tapered edge portion 1206.

Referring to FIGS. 109-116, a support member 1208 includes an opening 1210 designed to cooperate with the release member 1200 to enable the release member to be quickly released from a locked position and moved between two positions 90 degrees apart from one another. The opening 1210 includes a stop portion 1212 having surfaces 1212a and 1212b. With brief reference to FIGS. 115 and 116, the opening also includes steps 1214, 1216 and 1218. The steps 1214, 1216 and 1218 are at 90 degree increments about the inner periphery of the opening 1210. Each step 1214, 1216 and 1218 is further set back from a face surface 1219, while the stop 1212 is formed so as to be flush with the surface 1219.

Referring now to FIGS. 109-114, the release member 1200 is illustrated being inserted into and rotated within the opening 1210. The release member 1200 fits within the opening 1210 such that steps 1204a and 1204c are positioned on opposite sides of the stop 1212. When fully inserted into a "locked" position, as shown in FIG. 111, the release member 1200 cannot be turned. This is also illustrated in FIG. 114. The tapered surfaces 1206 on each step 1204 also helps to wedge the steps 1204 into the opening 1210 to eliminate play when the release member 1200 is in its locked position. When the release member 1200 is partially withdrawn to the point that the arms 1204 clear the steps 1214, 1216, and 1218, as shown in FIGS. 112 and 113, then the entire release member 1200 can be rotated 90 degrees counterclockwise and reinserted fully into the opening 1210. The release member 1200 is shown in this orientation in FIG. 114. The stop 1212 acts to prevent further rotation of the release member 1200 because of abutting contact of arm 1204c with stop 1212. If the release member 1200 is rotated from the orientation shown in FIG. 114 back into the orientation shown in FIG. 112, then the abutting contact between arm 1204*a* and stop 1212 limits the movement in this direction. Thus, the stop 1212, in connection with the arms 1204*a* and 1204*c*, limits the rotational movement of the release member 1200. The orientation of the release member 1200 relative to the opening 1210 in the two above described positions is shown in FIGS. 117 and 118. The steps 1214-1218 provide a means to lock the entire release member 1200 immovably in place.

Figure 121:
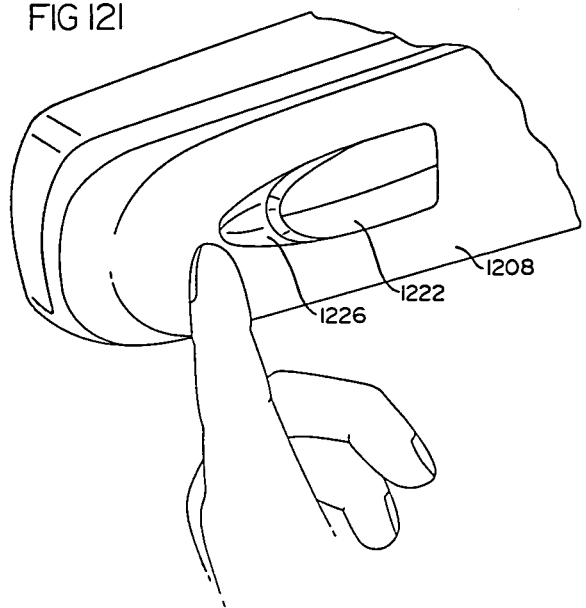
FIG. 121 is a perspective view of the support member and lever assembly shown in FIG. 119, with the lever thereof in the locked position.

Referring now to FIGS. 120 and 121, a lever assembly 1220 is illustrated for use with the release member 1200. The lever assembly comprises a lever 1222 which is pivotably mounted to a base element 1224. The base element 1224 is disposed within an opening 1210 in the support member 1208. In this embodiment, the opening 1210 includes a recess 1226 preferably deep enough so that the lever resides therein flush with a rear surface 1208*a* of the support member 1208 when the lever 1222 is in the closed position shown in FIG. 119.

Figure 122:
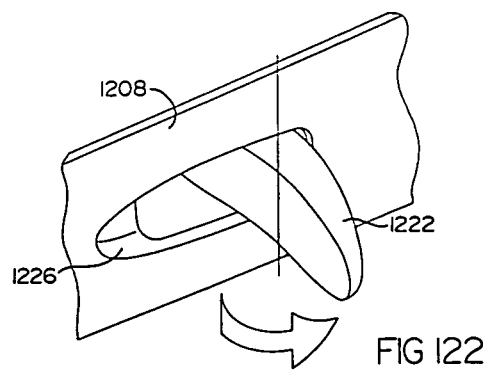
FIG. 122 is a view of the lever of FIG. 121 but with the lever in the open position.

The lever 1222 is coupled to a locking shaft 1228 preferably by a camming mechanism which retracts the locking shaft 1228 when the lever is moved to an open position, as shown in FIG. 120. The opposite end of the locking shaft 1228 is fixedly secured to the release member 1200 such as by threaded engagement with a portion of the release member 1200. The lever assembly 1220 thus forms a convenient means by which the release member 1200, and a ball joint assembly attached thereto, can be quickly and easily locked in place or unlocked. FIGS. 121 and 122 illustrate the lever 1222 being moved from the closed to the open position.

Referring now to FIGS. 123-126, another alternative embodiment of the extendable arm of FIG. 82 is shown. This embodiment includes a support arm 1250 having a plurality of longitudinally extending grooves or channels 1252*a*-1252*c* (FIG. 125). The channels 1252*b* and 1252*c* accept complementarily shaped shoulder portions 1254 formed in an interior surface of a support member 1256. The support member 1256 also includes a threaded opening 1258 through which a threaded portion 1260 of a locking knob 1262 is disposed. The threaded portion 1260 is fixedly secured to a knob portion 1264 and at its opposite end rotatably to a tab 1266. The tab 1266 is shaped so as to fit within the channel 1252*a* when the support arm 1250 is inserted into the support member 1256.

Figure 126:
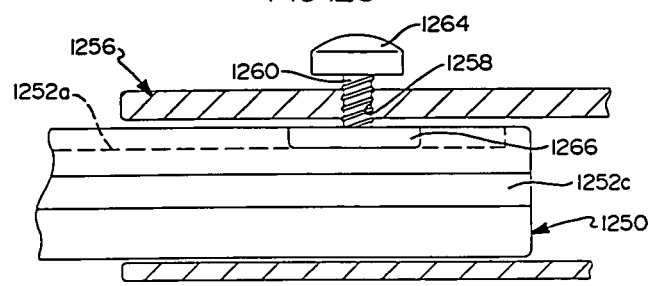
FIG. 126 is a partial cross sectional view taken in accordance with section line 126-126 in FIG. 125.

From FIGS. 124-126, the support arm 1250 is locked into place by simply screwing down the locking knob 1264, which clamps the arm 1250 securely within the support member 1252.

Figure 127:
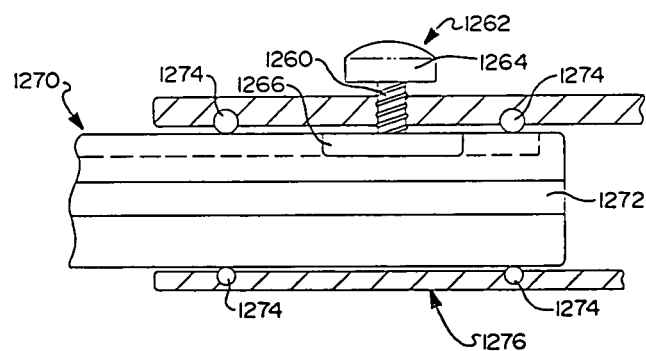
FIG. 127 is an alternative preferred embodiment of the present invention substantially in accordance with the embodiment of FIGS. 123-126 except for the inclusion of a plurality of rollers to assist in providing smooth rolling movement.
Figure 140:
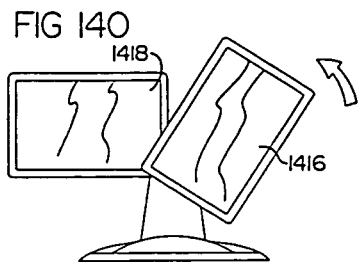
FIG. 140 is a front view of a dual LCD screen monitor system having one screen rotating into a portrait mode.

Referring now to FIG. 127, the locking knob 1262 is just as easily adaptable for use with a support arm 1270 which incorporates rollers 1274. The rollers 1274 allow an even smoother rolling movement of the support arm 1270 into and out of its associated support member 1276.

Referring to FIGS. 128-130, a release assembly 1300 for a ball joint is shown. The assembly 1300 includes a ball joint member 1302, a mounting block 1304, a washer assembly 1306, a retainer 1308 and an end cap 1310. Optionally, a flat washer 1312 can also be included.

The ball joint member 1303 includes a ball joint portion 1314 coupled via a shaft 1316 to a base member 1318. A locking shaft 1320 projects from the base member 1318. The locking shaft 1320 includes a groove 1322 formed on an end portion thereof for accepting the retainer 1308. The base member 1318 includes four registration detents 1324 spaced every 90 degrees about the periphery thereof.

The mounting block 1304 shown in FIGS. 128 and 129 includes four raised shoulder portions 1326, one at each corner thereof. The shoulder portions 1326 are further spaced so as to engage with the four registration detents 1324 when aligned with the detents 1324. A central opening 1327 provides a passage for the locking shaft 1320 to extend therethrough, and a recess 1329 in a rear surface 1331 provides room for the washer assembly 1306, the retainer 1308, the cover member 1310, and optionally the flat washer 1312, if included, to reside therein.

The assembled components are shown in FIG. 130. The washer assembly 1306 preferably comprises a "wave" washer assembly which provides a biasing force when compressed to maintain the ball joint member 1302 securely against the mounting block 1304. It will be appreciated that a wide variety of spring assemblies could be used to provide a suitable biasing force in lieu of the washer assembly 1306. When assembled, the shoulder portions 1326 are held securely within the registration detents 1324 when aligned therewith, thus preventing rotation of the ball joint member 1302.

When it is desired to reposition the ball joint member 1302, a pulling force is exerted on the member 1302 to momentarily urge it away from the mounting block 1304. While in this position, the ball joint member 1302 is rotated either clockwise or counterclockwise. As the ball joint member 1302 is rotated, the shoulders 1326 will automatically "snap" into the registration detents 1324 after 90 degrees of rotation. The ball joint member 1302 can thus be positioned and held within any of four positions, wherein each position is 90 degrees from its next adjacent position. Advantageously, no tools or partial disassembly of the system 1300 is required to rotate the ball joint member 1302.

Referring now to FIGS. 131-133, an arrangement is illustrated for attaching two LCD screens 1352 and 1354 of a dual screen LCD display system 1350 in such a manner that the screens can be supported by a pair of ball joint type supports on a common support arm 1356, and centered along a horizontal midpoint of each, or aligned such that the lower or upper edges of each LCD screen are aligned with each other.

In FIG. 133, the distance Xa is set equal to Xb, when the two LCD screens 1352 and 1354 are to be aligned along their upper horizontal edges. This produces hypotenuse Xc. Distance Y1 represents the desired clearance between the two LCD screens 1352,1354. Distance F represents the difference in distance by which LCD screen 1354 exceeds LCD screen 1352. Distance Xb is ½ the total distance G of LCD screen 1352. When LCD screen 1352 is positioned in the landscape orientation, its top edge is aligned with the top edge of LCD screen 1354. When it is removed from its ball joint support, the ball joint support rotated 90 degrees clockwise, and the screen 1352 is rotated 90 degrees clockwise and reattached in the portrait mode, edge 1352*a* will be aligned with edge 1354*a* of screen 1354. Conversely, LCD screen 1354 could be removed, its ball joint support rotated 90 degrees clockwise, the screen 1354 rotated likewise, and resecured to its ball joint such that edge 1352*a* of screen 1352 and edge 1354*a* of screen 1354 are both aligned parallel to each other, which will place edges 1352*a*' and 1354*a*' in horizontal alignment with each other.

Referring to FIG. 131, the LCD screens 1352 and 1354 can be aligned along edges 1352*c* and 1354*c* if the mounting point of screen 1352 is moved a distance d in the X direction and a distance c in the Y direction, and where distance c equals d, and c plus d is further equal to G. The effect of this is that the pivot point of LCD screen 1352 moves along the hypotenuse Xc a small distance, thereby allowing a shorter support arm 1356 to be used. Note H is also ½ the distance of the LCD screen 1352 total height. Distance H is also ½ the total width of LCD screen 1354. If the LCD screen 1352 is removed, rotated 90 degrees clockwise and reattached to the support arm 1356, then the edges 1352*d* and 1354*d* will be horizontally aligned. It will be appreciated that an arm 1356 having the same length as the arm shown in FIG. 133 could be used, but that such a longer arm would require that the ball joint supports which support the LCD screens 1352 and 1354 on the arm 1356 be mounted on the arm for sliding movement so they can be positioned closer to one another than the spacing shown in FIG. 133. In this manner the ball joints could be readjusted closer to each other when the screens 1352 and 1354 are to be aligned as shown in FIG. 131.

Referring to FIG. 132, the LCD screen 1352 can be positioned perfectly centered along the vertical side of LCD screen 1354, if the pivot point is located offset from a horizontal midpoint of screen 1352 by a distance b in the X direction and a distance a in the Y direction, and if b is equal to a, and the sum of b and a equals B2. Since the LCD screen 1352 is centered along the vertical edge of screen 1354, B2 is equal to B1. In this instance, B1 and B2 will each be ½ of distance F designated in FIG. 133. The LCD screen 1352 can also be removed, its ball joint support rotated 90 degrees clockwise, and the screen 1352 reattached to the support arm 1356, which will put edge 1352*d* thereof in horizontal alignment with edge 1354*d* of screen 1354.

It will also be noted that the support arm 1356 shown in FIG. 132 also is shorter than the support arm 1356 shown in FIG. 133. By therefore using the above-described guidelines, the ball joint supports of each of the LCD screens 1352 and 1354 can be mounted at specific points on the rear surface of each LCD screen 1352 and 1354, and spaced apart on the support arm 1356, such that the two screens can be aligned together in various orientations when one is in the portrait orientation and the other is in a landscape orientation. It will also be appreciated that while the above-described dimensions have been discussed only with regard to LCD screen 1352, that screen 1354 will need to supported, in each of FIGS. 131-133, with the same dimensional requirements as its accompanying screen 1352 in each figure. Also, the distances Y1, Y2 and Y3 shown in FIGS. 133, 132 and 131, respectively, need to be taken into account in each instance when determining the needed spacing between the two pivot points on the support arm 1356.

Referring now to FIGS. 134-139, a ball joint assembly 1400 is illustrated which enables rotation of a neck portion 1402 relative to a base portion 1404 when the neck portion is urged into the position shown in FIGS. 136 and 137. This feature is useful for enabling an LCD screen to be moved from a portrait orientation into a landscape orientation, or vice versa, without the need to first physically detach the LCD screen from its ball joint support assembly, while still permitting booking of the two screens relative to each other. It will be appreciated that with the ball joint support assemblies described previously herein, rotation of one of two closely positioned LCD screens first requires removal of the screen before it can be rotated. After being rotated into the desired orientation, the LCD screen would be reattached. The problem of sufficient clearance between the two LCD screens, and the limitations on the construction of the ball joint assembly itself, did not permit one of the LCD screens to simply be rotated into another orientation.

Referring further to FIGS. 134 and 135, the ball joint assembly 1400 overcomes this shortcoming by providing a groove formed in the base member of the assembly 1400 which enables the neck portion 1402 to be rotated once the neck is moved into a booked position. To accomplish this, the neck portion 1402 includes a pin 1406 fitted in the ball member 1408 thereof. The pin 1406 is restrained for movement within a channel 1410. The channel enables precise booking movement of the LCD screen (not shown) attached to a keyed end portion 1412 of the neck portion 1402.

Figure 141:
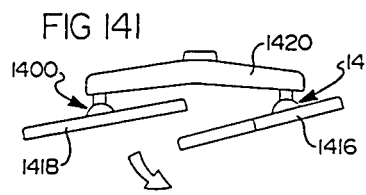
FIG. 141 is a top view of the display system of FIG. 140 illustrating the outwardly booked position of the rightmost LCD screen during rotation thereof.

Formed within the base portion perpendicularly to channel 1410 is a groove 1414. Groove 1414 is sized to accept the pin 1406 once the pin is moved into alignment with the groove 1414. This alignment is shown in FIGS. 136 and 137. When the pin 1406 is aligned as shown in FIGS. 136 and 137, the LCD screen will be booked outwardly such as shown in FIG. 141 by screen 1416. Once booked into this orientation, LCD screen 1418 will not interfere with subsequent rotation of screen 1416.

Figure 142:
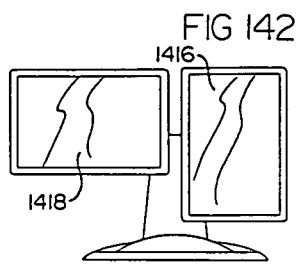
FIG. 142 is a front view of the display system of FIG. 140 but with the leftmost LCD screen booked outwardly to enable rotation thereof.
Figure 143:
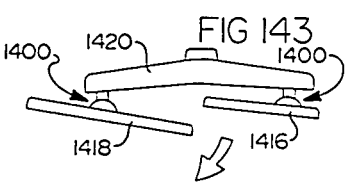
FIG. 143 is a plan view of the display system of FIG. 142.
Figure 144:
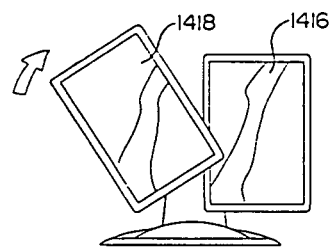
FIG. 144 is a front view of the display system of FIG. 142 in the process of being rotated clockwise while in an outwardly booked position.
Figure 146:
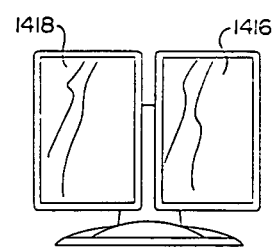
FIG. 146 is a front view of the display system of FIG. 144 with both LCD screens rotated completely into a portrait mode.

Referring to FIGS. 138-139 and 140-143, LCD screen 1416 can then be rotated counterclockwise into the portrait orientation without interference from screen 1418. The groove 1414 thus enables rotation of the ball member 1408 but only once the screen 1416 has been booked outwardly a sufficient degree to place the pin 1406 in alignment with the groove 1406. This provides the advantage of preventing accidental rotation of the LCD screen 1416, since the user is required to move the screen 1416 to an outwardly booked position (FIG. 141) before any rotation can be effected. The fully rotated screen 1416 is illustrated in FIGS. 142 and 143.

Figure 145:
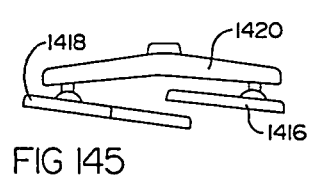
FIG. 145 is a plan view of the display system of FIG. 144.
Figure 147:
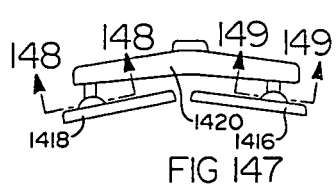
FIG. 147 is a plan view of the display system of FIG. 146.
Figure 150:
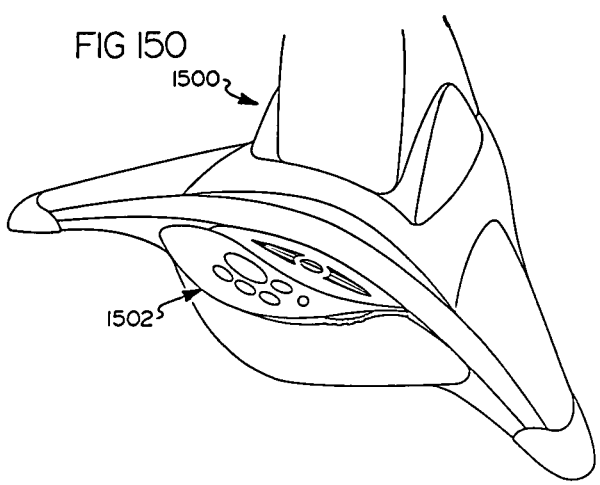
FIG. 150 is a perspective view of a portion of a base assembly for an LCD display system incorporating a built in control panel.
Figure 151:
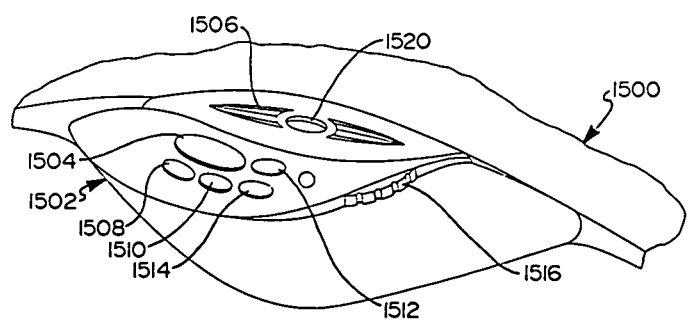
FIG. 151 is an enlarged perspective view of the control panel shown in FIG. 150.

If the ball joint assembly is orientated on its support arm 1420 in FIGS. 144-147 such that the groove 1406 is 180 degrees displaced from the orientation in FIGS. 136 and 137, then screen 1418 in FIGS. 144-147 can be similarly rotated once it is booked outwardly as shown in FIG. 145. Accordingly, the ball joint assembly 1400 enables each of the screens 1416 and 1418 to be rotated between the portrait and landscape orientations once they are booked outwardly a sufficient degree. As such, there is no need to first remove either screen if it needs to be repositioned.

Referring now to FIGS. 148 and 149, a portion of a base assembly 1500 for an LCD screen is illustrated. The base assembly 1500 incorporates a built in control panel, which is shown in enlarged fashion in FIG. 1502. The control panel incorporates an ON/OFF switch 1504, a built in speaker 1506, a volume "UP" button 1508 and a volume "DOWN" volume button 1510 for enabling easy adjustment of the volume of the speaker 1506. A "SELECT" button 1512 enables the user to select which one of several LCD screens being supported can be adjusted for picture brightness, centering, etc. A "RESET" button 1514 enables the user to reset the various visual adjustments (i.e., contrast, brightness, etc.) to default settings. A dial 1516 enables the user to scroll through various choices provided on the selected screen in menu format. Standby LED 1518 provides an provide an indication that one or more of the screens are powered on. An infrared sensor 1520 enables use of the display system with a wireless keyboard. It will be appreciated that not all of the features of the control panel 1502 need to be included and, alternatively, that other switches or components could just as easily be incorporated if needed.

Referring now to FIG. 152, a display system 1550 is shown which is substantially similar to the display system 400 of FIG. 65 with the exception of a camera 1552 mounted in a support arm 1554 thereof. The camera enables convenient video conferencing to be accomplished from the display system 1550.

The camera 1552 includes a flexible tubular sheath 1556 which holds the orientation it is placed in. At one outermost end of the sheath 1556 is mounted an optical camera 1558. The flexibility of the sheath 1556 enables the camera 1552 to be adjusted to precisely the desired height to suit the user seated in front of the display system 1550.

Referring to FIG. 153, an alternative preferred embodiment of the camera 1552' is shown in which a microphone 1560 is attached to the optical camera 1558'.

Figure 154:
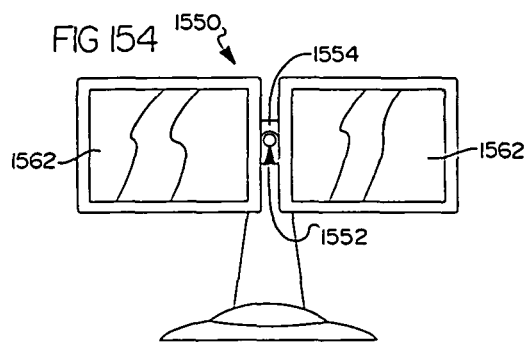
FIG. 154 is a front view of the display system of FIG. 152 including a pair of LCD screens attached thereto.
Figure 155:
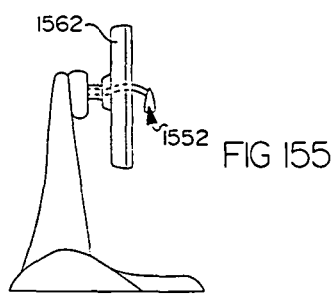
FIG. 155 is a side view of the display system of FIG. 155.
Figure 156:
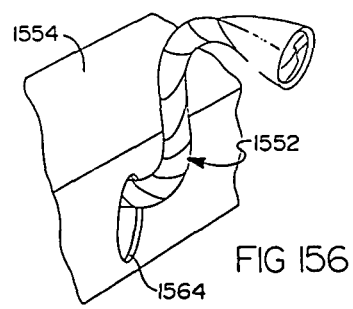
FIG. 156 is an enlarged perspective view of the camera shown in FIG. 152.

FIG. 154 illustrates the camera 1552 disposed between a pair of LCD screens 1562. FIG. 155 even better illustrates the flexibility of the camera 1552. The flexibility of the sheath 1556 enables the optical camera 1558 to be pointed at a desired angle, whether at the user or down on a document placed on a table supporting the display system 1550. FIG. 156 illustrates in enlarged fashion the sheath 1556 of the camera 1552 exiting through an opening 1564 in the arm 1554.

Referring now to FIG. 157, a display system 1600 in accordance with another alternative preferred embodiment is shown. The system 1600 includes a pair of LCD screens 1602, with one of the screens including a built-in camera 1604 placed within the interior area of the bezel 1606 of the LCD screen.

FIG. 158 shows a clip 1608 having a built-in camera head 1610 suitable for coupling to the bezel of one of the LCD screens 1602. The clip 1608 is shown in FIG. 159 secured to a bezel 1612 of the LCD screen 1602. Advantageously, the clip 1608 can be moved around the bezel 1612 and secured at different positions on the bezel 1612 to best suit the position of the LCD screen 1602 relative to the user.

We claim:

1. A computer display support structure comprising:
   a support member having a base and a column connected thereto; and
   an arm assembly connected to the column, said arm assembly a) capable of supporting at or toward one end thereof a first computer display that displays a first image, b) capable of supporting at or toward an opposite end thereof a second computer display that displays a second image, c) including a first mounting assembly for mounting the first computer display, d) including a second mounting assembly for mounting the second computer display, e) having at least i) a first operating position in which the second image is viewable by a first person viewing the first image and ii) a second operating position in which the second image is viewable by a second person opposite the first person viewing the first image, such that when the second image is viewable by the second person in the second operating position, the first image is not viewable by the second person, and f) having an arm that extends from the column, said arm including two portions that are connected via a joint that allows the two portions to hinge, wherein
   (i) the arm assembly is extendable from a retracted configuration to an extended configuration, the distance between the one end and the opposite end being greater in the extended configuration than in the retracted configuration,
   (ii) each of the one end and the opposite end is capable of moving independently between a first location and a second location that is further away from where the arm assembly is connected to the column than the first location,
   (iii) in both the first operating position and the second operating position each of the first computer display and the second computer display is capable of being more vertical than horizontal,
   (iv) the first mounting assembly is adapted for supporting the rear of the first computer display, and
   (v) the second mounting assembly is adapted for supporting the rear of the second computer display.

2. A computer display support structure according to claim 1, wherein the ends are oriented vertically when the structure is in the first operating position.

3. A computer display support structure according to claim 1, wherein the arm that extends from the column has the one end, and wherein the arm assembly includes a second arm having the opposite end.

4. A computer display support structure according to claim 3, wherein the arm that extends from the column is adapted to telescope.

5. A computer display support structure according to claim 3, wherein the base is adapted to rest on a horizontal surface, and when so disposed, the column is substantially vertical.

6. A computer display support structure according to claim 5, further comprising the first computer display and the second computer display.

7. A computer display support structure according to claim 6, wherein, in the first operating position, the arm assembly is disposed behind the first and second computer displays when the first and second computer displays are mounted.

8. A computer display support structure according to claim 1, wherein the first mounting assembly includes a ball joint and the second mounting assembly includes a ball joint.

9. A computer display support structure according to claim 1, wherein the arm assembly allows the first computer display and the second computer display to be folded together to form a compact assembly when not in operational use.

10. A computer display support structure according to claim 1, wherein one component of the arm assembly extends from the support member and includes the joint, and wherein the joint is disposed away from the support member to allow the one component to fold back towards itself.

11. A computer display support structure according to claim 1, wherein the base is suitable for resting on a counter.

12. A computer display support structure according to claim 11, wherein the base has a width that is smaller than the length of the arm assembly in the extended configuration.

13. A computer display support structure according to claim 11, wherein the base extends horizontally outwards from the support column to prevent the support column from tipping.

14. A computer display support structure according to claim 11, further comprising the first computer display and the second computer display, wherein the top of the first computer display and the top of the second computer display are higher than the support column when the first and second computer displays are mounted and the base is resting on a counter.

15. A computer display support structure according to claim 1, wherein the arm assembly consists of directly connected components.

16. A computer display support structure according to claim 1, wherein the arm assembly is capable of being connected to the support member at more than one position thereof.

17. A computer display structure according to claim 16, wherein a) the first mounting assembly is adapted for allowing the first computer display to pivot between a first landscape orientation and a first portrait orientation, and b) the second mounting assembly is adapted for allowing the second computer display to pivot between a second landscape orientation and a second portrait orientation, a part of the first computer display being capable of being disposed in front of the second computer display during some of the pivoting of the first computer display between the first landscape orientation and the first portrait orientation.

18. A computer display structure according to claim 1, wherein a) the first mounting assembly is adapted for allowing the first computer display to pivot between a first landscape orientation and a first portrait orientation, and b) the second mounting assembly is adapted for allowing the second computer display to pivot between a second landscape orientation and a second portrait orientation, a part of the first computer display being capable of being disposed in front of the second computer display during some of the pivoting of the first computer display between the first landscape orientation and the first portrait orientation.

* * * * *